(12) United States Patent
Ibaraki

(10) Patent No.: US 10,191,651 B2
(45) Date of Patent: Jan. 29, 2019

(54) MOBILE TERMINAL

(71) Applicant: KYOCERA CORPORATION, Kyoto (JP)

(72) Inventor: Atsuko Ibaraki, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 217 days.

(21) Appl. No.: 15/163,537

(22) Filed: May 24, 2016

(65) Prior Publication Data

US 2016/0349985 A1   Dec. 1, 2016

(30) Foreign Application Priority Data

May 27, 2015   (JP) ................... 2015-107315

(51) Int. Cl.
| | |
|---|---|
| *G09G 5/377* | (2006.01) |
| *G06F 3/0488* | (2013.01) |
| *G06F 3/0481* | (2013.01) |
| *G06F 3/0484* | (2013.01) |

(52) U.S. Cl.
CPC ...... *G06F 3/04883* (2013.01); *G06F 3/04817* (2013.01); *G06F 3/04845* (2013.01)

(58) Field of Classification Search
CPC .. G06F 3/0481; G06F 3/04883; G06F 3/0488; G06F 3/04845; G06F 3/04817
USPC ......................................... 715/798
See application file for complete search history.

(56) References Cited

U.S. PATENT DOCUMENTS

| | | | | |
|---|---|---|---|---|
| 9,372,623 B2* | 6/2016 | Shiota | ............... | G06F 3/04817 |
| 9,535,568 B2* | 1/2017 | Hong | ............... | G06F 3/04817 |
| 2011/0252383 A1* | 10/2011 | Miyashita | ........... | G06F 3/0482 |
| | | | | 715/863 |
| 2012/0062590 A1* | 3/2012 | Morohoshi | ....... | G06F 17/30265 |
| | | | | 345/629 |
| 2012/0188275 A1* | 7/2012 | Shimazu | ............. | G06F 3/0488 |
| | | | | 345/629 |
| 2013/0047078 A1* | 2/2013 | Bever | .................. | G06K 9/723 |
| | | | | 715/245 |
| 2014/0351724 A1* | 11/2014 | Kim | .................. | G06F 3/04883 |
| | | | | 715/765 |
| 2015/0149837 A1* | 5/2015 | Alonso | ............. | G06K 7/10227 |
| | | | | 714/57 |
| 2015/0339018 A1* | 11/2015 | Moon | ................ | G06F 3/0484 |
| | | | | 715/765 |

FOREIGN PATENT DOCUMENTS

| | | | | |
|---|---|---|---|---|
| JP | 2013229003 A | * 11/2013 | .......... | G06F 3/0481 |
| JP | A-2013-229004 | 11/2013 | | |

* cited by examiner

*Primary Examiner* — Scott T Baderman
*Assistant Examiner* — Hassan Mrabi
(74) *Attorney, Agent, or Firm* — Duane Morris LLP

(57) ABSTRACT

When a lateral sliding operation is executed starting from a position on a touch panel corresponding to a specific icon being shown, at least one processor shrinks and moves an image being shown in a direction toward an end point of the lateral sliding operation in a showable area. The specific icon includes an icon, when pressed and held, not causing a mobile terminal to perform an operation.

17 Claims, 27 Drawing Sheets

MOBILE TERMINAL

CROSS-REFERENCE TO RELATED APPLICATION

The present application claims priority under 35 U.S.C. § 119 to Japanese Patent Application No. 2015-107315, filed on May 27, 2015, entitled "Mobile Terminal." The content of which is incorporated by reference herein in its entirety.

FIELD

The present disclosure relates to a mobile terminal.

BACKGROUND

A mobile terminal that can be operated with one hand is known. For example, a certain mobile terminal changes the position of a plurality of icons to a position on the arc of a sector having a predetermined radius centering on a contact position of a finger on a touch panel and shows the icons on the touch panel. By changing the position of the plurality of icons to the position on the arc of a sector centering on a contact position where a finger can reach, a user can freely operate the mobile terminal with one hand. As a result, it is possible to increase the convenience for a user who is going to operate a mobile phone terminal with one hand.

SUMMARY

A mobile terminal of an aspect includes a display configured to show an image including a plurality of icons in a showable area, a touch panel, and at least one processor configured to, when a lateral sliding operation is executed starting from a position on the touch panel corresponding to a specific icon being shown, shrink and move the image being shown in a direction toward an end point of the lateral sliding operation in the showable area. The specific icon includes an icon, when pressed and held, not causing the mobile terminal to perform an operation.

A mobile terminal of another aspect includes a display configured to show an image including a plurality of icons in a showable area, a touch panel, and at least one processor configured to, when a lateral sliding operation is executed starting from a position on the touch panel corresponding to a navigation key, shrink and move the image being shown in a direction toward an end point of the lateral sliding operation in the showable area.

A mobile terminal of still another aspect includes a display configured to show an image including a plurality of icons in a showable area, a touch panel, and at least one processor configured to, when a downward sliding operation is executed starting from a certain position on a lateral edge of the touch panel, shrink and move the image being shown in a direction toward an end point of the downward sliding operation in the showable area.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments will be described with reference to the drawings.

First Embodiment

Figure 1:
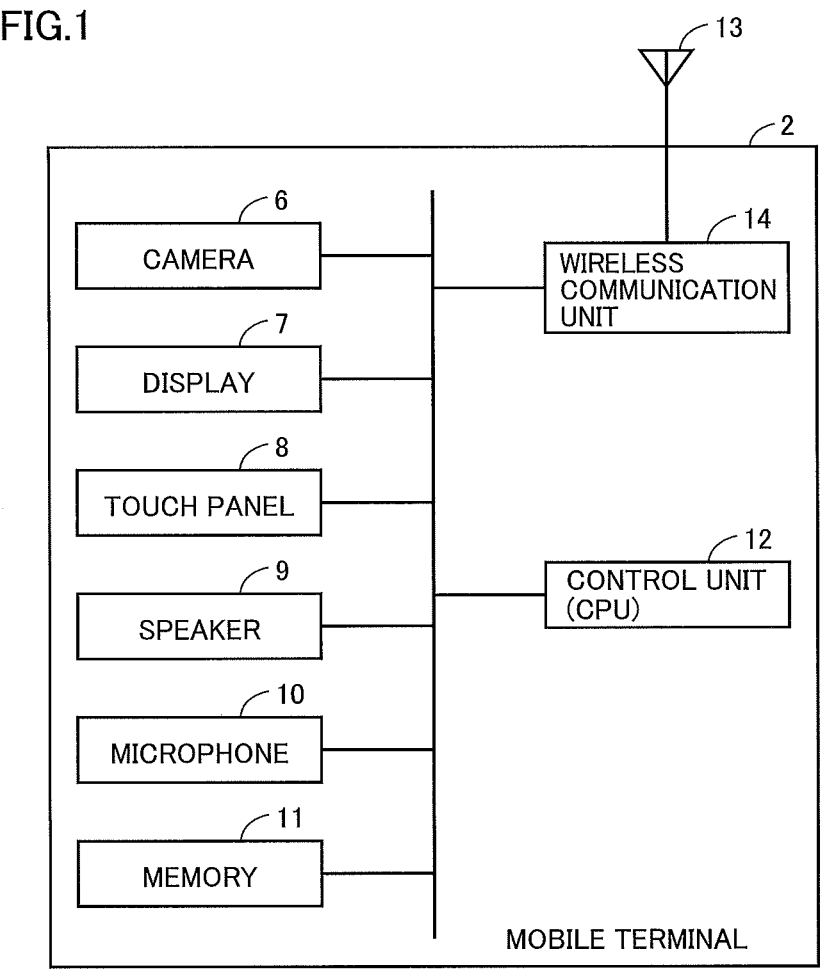
FIG. 1 shows a configuration of a mobile terminal according to an embodiment.

FIG. 1 shows a configuration of a mobile terminal 2 according to an embodiment. This mobile terminal 2 includes a smartphone, a mobile phone, a tablet, a notebook personal computer, and the like.

This mobile terminal 2 includes a wireless communication unit 14, an antenna 13, a camera 6, a display 7, a touch panel 8, a speaker 9, a microphone 10, a memory 11, and a control unit 12.

Camera 6 can capture an image of a subject, and can output a still image or a moving image. Camera 6 is an in-camera (front-facing camera) located in the front surface of mobile terminal 2 and capturing an image of a subject present on the front surface side, or an out-camera (rear-facing camera) located in the rear surface of mobile terminal 2 and capturing an image of a subject present on the rear surface side. Mobile terminal 2 may include both of the in-camera and the out-camera.

Display 7 can show a screen output from control unit 12. Display 7 includes, for example, a liquid crystal display, an organic EL (Electro-Luminescence) display, and the like.

Touch panel 8 can function as an input receiving unit which receives an input by a user. Although touch panel 8 detects contact or approach of an object (a user's finger, a pen or the like) in the capacitance method, touch panel 8 is not limited to this, but may detect an input by a user in another method, such as, for example, an infrared method or an electromagnetic induction method.

Speaker 9 may be implemented by, for example, an electromagnetic speaker. Alternatively, speaker 9 may be implemented by a piezoelectric vibration element to vibrate a panel on the surface for transmitting sound to a user.

Voice of a user of mobile terminal 2, noise sound around mobile terminal 2, and the like are input to microphone 10.

Memory 11 can store data and programs.

Wireless communication unit 14 can communicate with a wireless base station through antenna 13. Wireless communication unit 14 includes an A/D converter, a D/A converter, a modulating unit, a demodulating unit, a frequency converter, an amplifier, and the like.

Control unit 12 can cause an image to be shown in a showable area of display 7 based on a screen attribute. At a normal time, control unit 12 can cause an image to be shown on the entire showable area of display 7 based on a normal screen attribute. After the screen attribute is changed to a shrink show, control unit 12 can show a shrunk image at a portion of the showable area of display 7. When a lateral sliding operation starting from a position on touch panel 8 corresponding to a launcher folder icon being shown is executed, control unit 12 can shrink and move an image being shown in a direction toward the end point of the sliding operation in the showable area. The functions of control unit 12 can be achieved by at least one CPU (Central Processing Unit) executing a control program stored in memory 11. Control unit 12 may be at least one processor. In accordance with various embodiments, the at least one processor may be implemented as a single integrated circuit (IC) or as multiple communicatively coupled IC's and/or discrete circuits. It is appreciated that the at least one processor can be implemented in accordance with various known technologies. In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

A launcher folder icon is an icon representing a folder including one or more launcher icons. A launcher icon is an icon representing an application that can be operated in mobile terminal 2. When a launcher icon is selected by a tap operation (an operation of contacting touch panel 8 with a finger and then lifting the finger), an application is executed. The launcher folder icon is located at the lowest arrangement position among the arrangement positions of a plurality of icons shown on the home screen. When the launcher folder icon is selected by a tap operation, the launcher icons included in the folder are shown.

(Operation)

Figure 2:
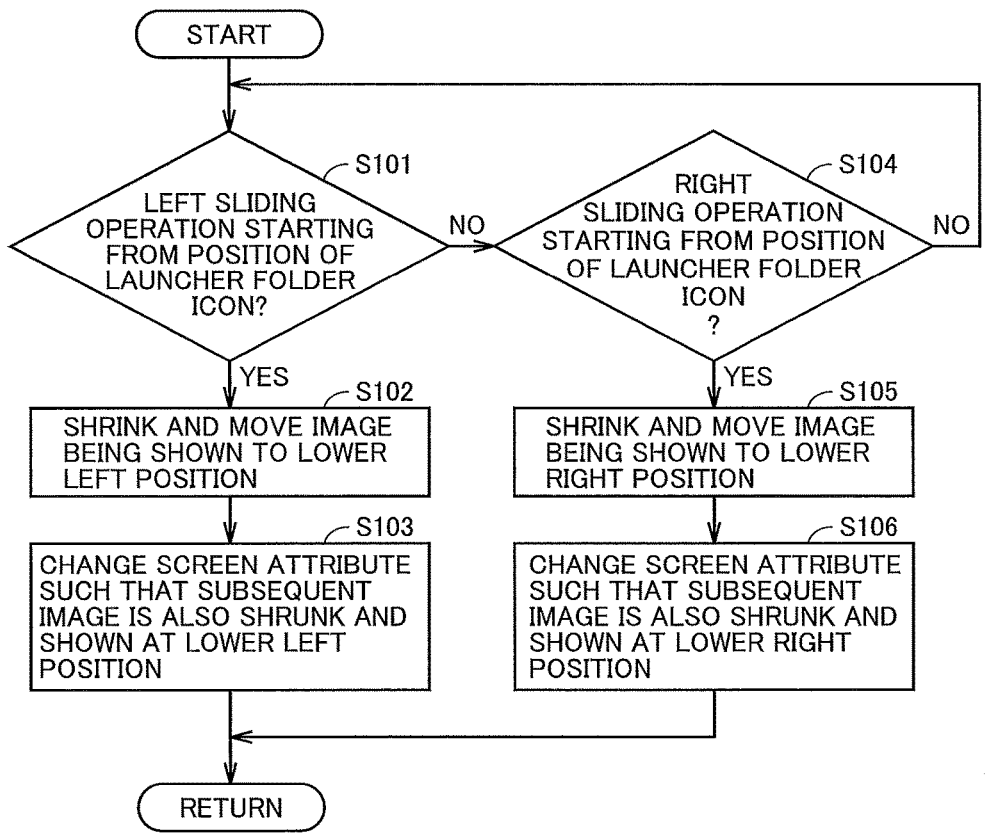
FIG. 2 is a flowchart showing an operation procedure according to a first embodiment.

FIG. 2 is a flowchart showing an operation procedure according to a first embodiment.

Referring to FIG. 2, in step S101, when a user executes a left sliding operation starting from the position of the launcher folder icon on touch panel 8, the process proceeds into step S102.

In step S102, control unit 12 can shrink an image being shown and move the image to a lower left position in the showable area of display 7.

In step S103, control unit 12 can change the screen attribute such that an image to be shown subsequently is also shrunk and shown at the lower left position in the showable area of display 7. When showing a subsequent image, control unit 12 can thus maintain the function of showing a shrunk image at a lower left position (lower-left shrink screen).

In step S104, when a user executes a right sliding operation starting from the position of the launcher folder icon on touch panel 8, the process proceeds into step S105.

In step S105, control unit 12 can shrink an image being shown and move the image to a lower right position in the showable area of display 7.

In step S106, control unit 12 can change the screen attribute such that an image to be shown subsequently is also shrunk and shown at the lower left position in the showable area of display 7. When showing a subsequent image, control unit 12 can thus maintain the function of showing a shrunk image at a lower right position (lower-right shrink screen).

Operation Example

Figure 3:
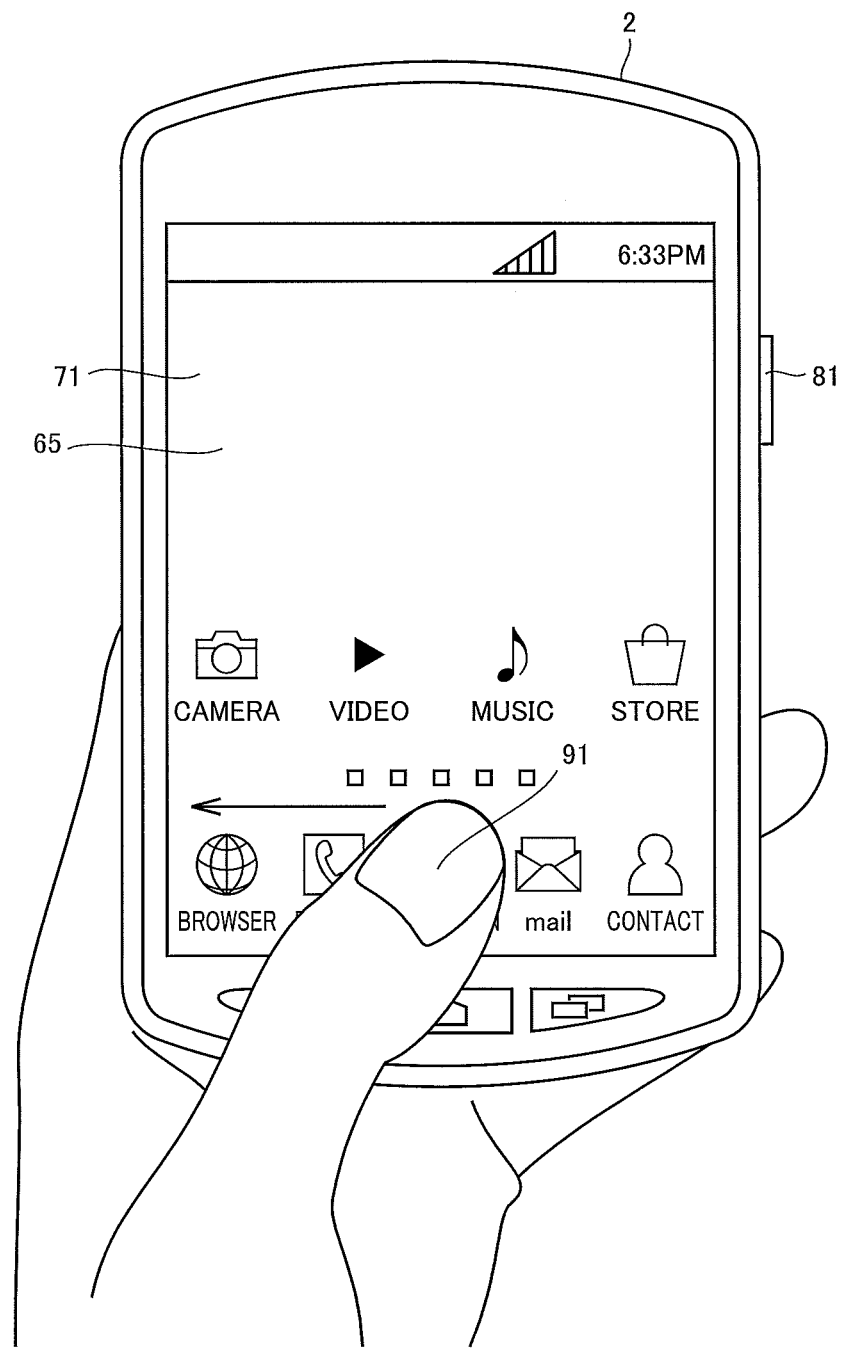
FIG. 3 shows a state when a user holds the mobile terminal with his/her left hand and has started an operation of shrinking an image in the first embodiment.

FIG. 3 shows a state when a user holds mobile terminal 2 with his/her left hand and has started an operation of shrinking an image in the first embodiment.

Referring to FIG. 3, an image 71 is shown in a showable area 65 of display 7. Image 71 includes a launcher folder icon 91. The arrangement position of launcher folder icon 91 is on the lowest side in the positions of a plurality of icons, and at the middle in the lateral direction. A user holds mobile terminal 2 with his/her left hand, and executes a left sliding operation with the left thumb starting from launcher folder icon 91 in image 71.

Pressing and holding launcher folder icon 91 does not cause mobile terminal 2 to perform any operation, while pressing and holding other icons brings them into the movable state. Because of such a characteristic, launcher folder icon 91 is suitable as an icon for instructing image shrinking. Unlike a tapping operation of touching touch panel 8 with a finger and lifting the finger immediately, a press-and-hold operation indicates an operation of continuously touching touch panel 8 for a predetermined time period.

Figure 4:
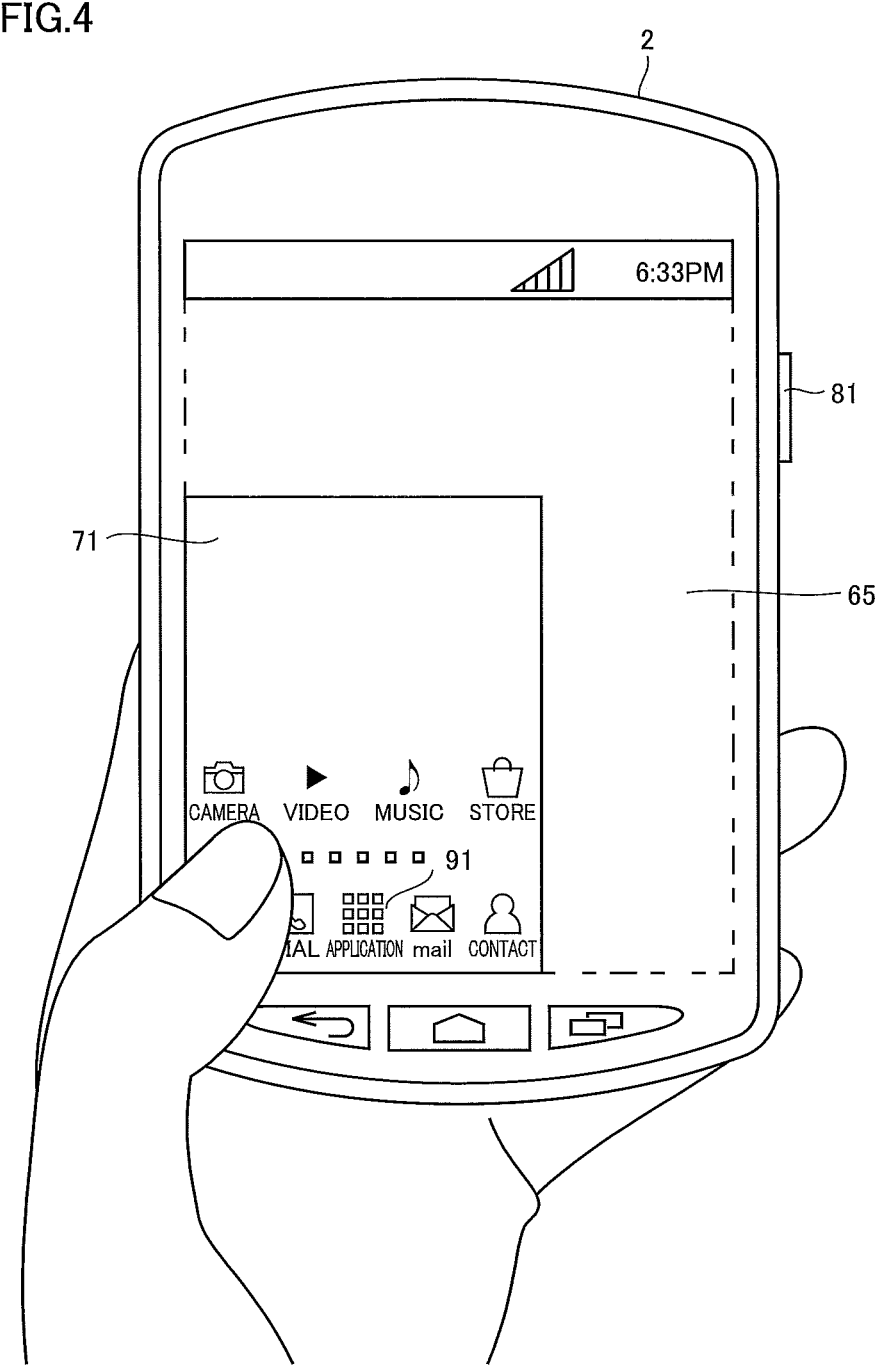
FIG. 4 shows a state when a user holds the mobile terminal with his/her left hand and has terminated the image shrinking operation in the first embodiment.

FIG. 4 shows a state when a user holds mobile terminal 2 with his/her left hand and has terminated the image shrinking operation in the first embodiment.

After the sliding operation described with reference to FIG. 3 is terminated, image 71 has been shrunk and is shown around the end point of the sliding operation in showable area 65, that is, at a lower left position, as shown in FIG. 4.

Figure 5:
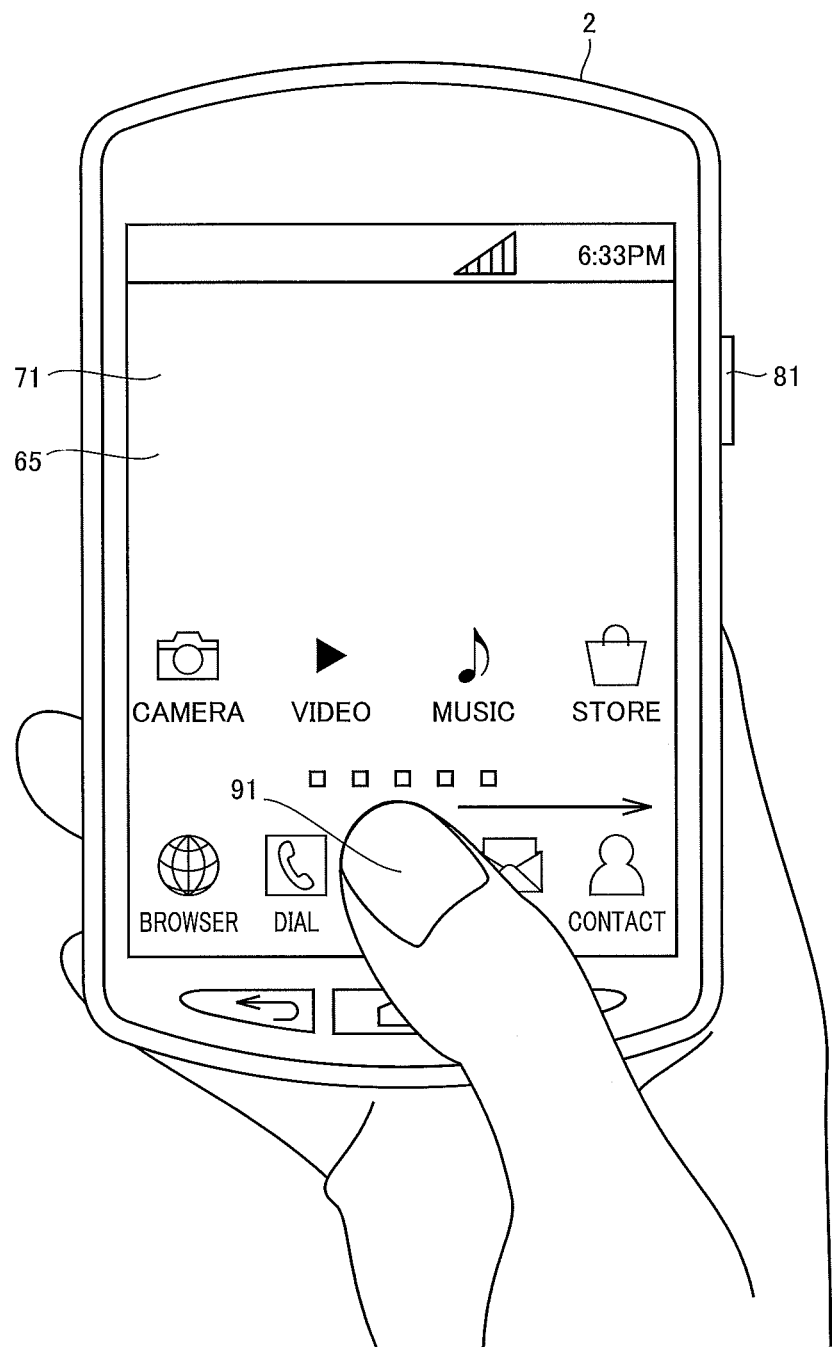
FIG. 5 shows a state when a user holds the mobile terminal with his/her right hand and has started the image shrinking operation in the first embodiment.

FIG. 5 shows a state when a user holds mobile terminal 2 with his/her right hand and has started the image shrinking operation in the first embodiment.

Referring to FIG. 5, image 71 is shown in showable area 65 of display 7. The user holds mobile terminal 2 with his/her right hand, and executes a right sliding operation with the right thumb starting from launcher folder icon 91 in image 71.

Figure 6:
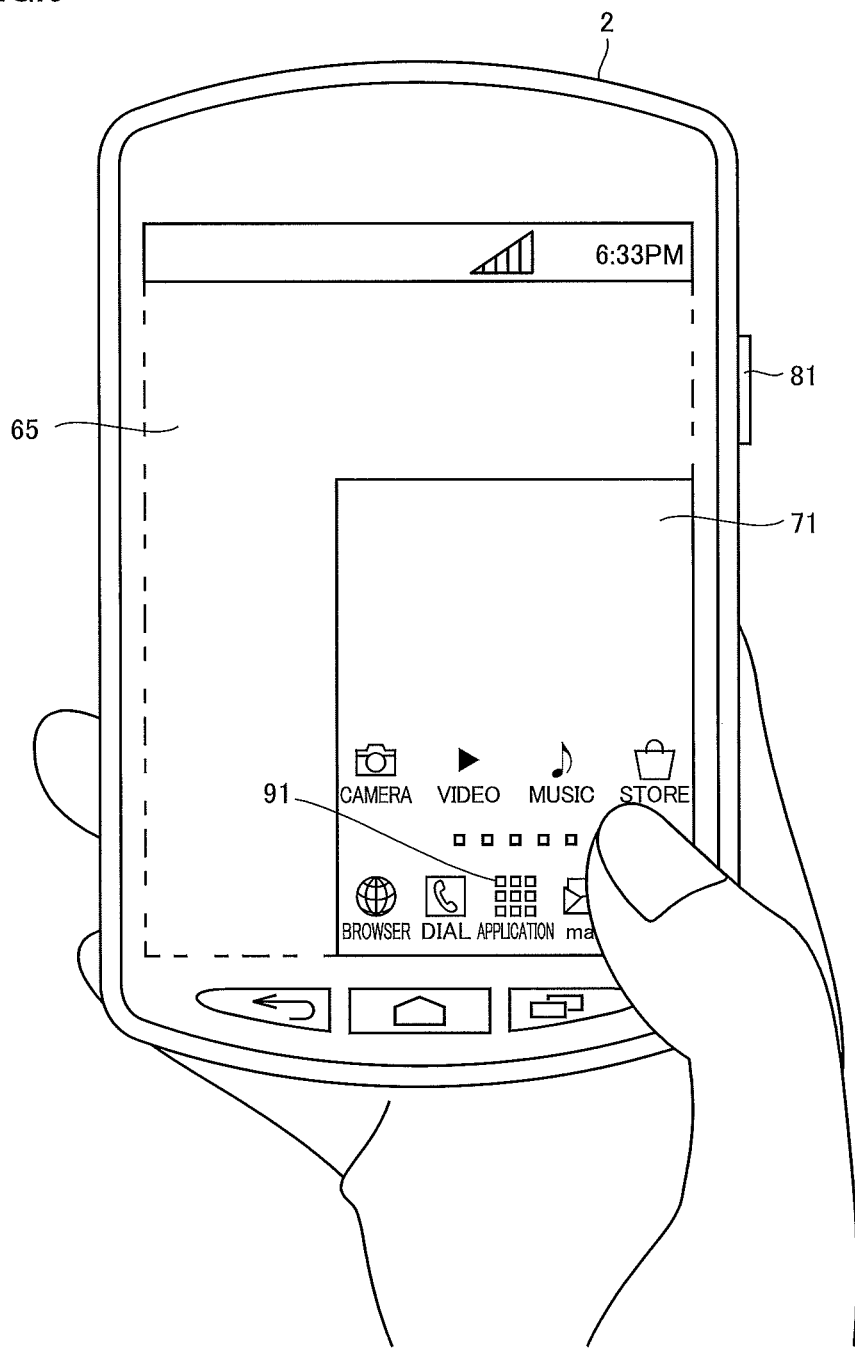
FIG. 6 shows a state when a user holds the mobile terminal with his/her right hand and has terminated the image shrinking operation in the first embodiment.

FIG. 6 shows a state when a user holds mobile terminal 2 with his/her right hand and has terminated the image shrinking operation in the first embodiment.

After the sliding operation described with reference to FIG. 5 is terminated, image 71 has been shrunk and is shown around the end point of the sliding operation in showable area 65, that is, at a lower right position, as shown in FIG. 6.

As described above, according to the first embodiment, an image is shrunk and moved to a lower left or lower right position by laterally sliding the launcher folder icon suitable for instructing image shrinking. A user can thus touch an icon included in the shrunk image with one hand.

The launcher folder icon may be replaced by an icon representing a folder including a certain icon other than the launcher icon. The launcher folder icon may be replaced by a specific icon which does not cause any operation when pressed and held.

After the screen attribute is changed such that a shrunk image is shown, a power/lock key 81 shown in FIG. 4, for example, may be pressed down to return to a normal screen.

Second Embodiment

In a second embodiment, the launcher folder icon in the first embodiment is replaced by a navigation key.

The navigation key is implemented by a soft key shown in the showable area of display 7 similarly to icons, or is located outside the showable area of display 7 and is implemented by an electrostatic key of capacitance type different from touch panel 8.

In the second embodiment, when a lateral sliding operation starting from a position on touch panel 8 corresponding to the navigation key being shown is executed, control unit 12 can shrink and move an image being shown in the direction toward the end point of the sliding operation in the showable area.

(Operation)

Figure 7:
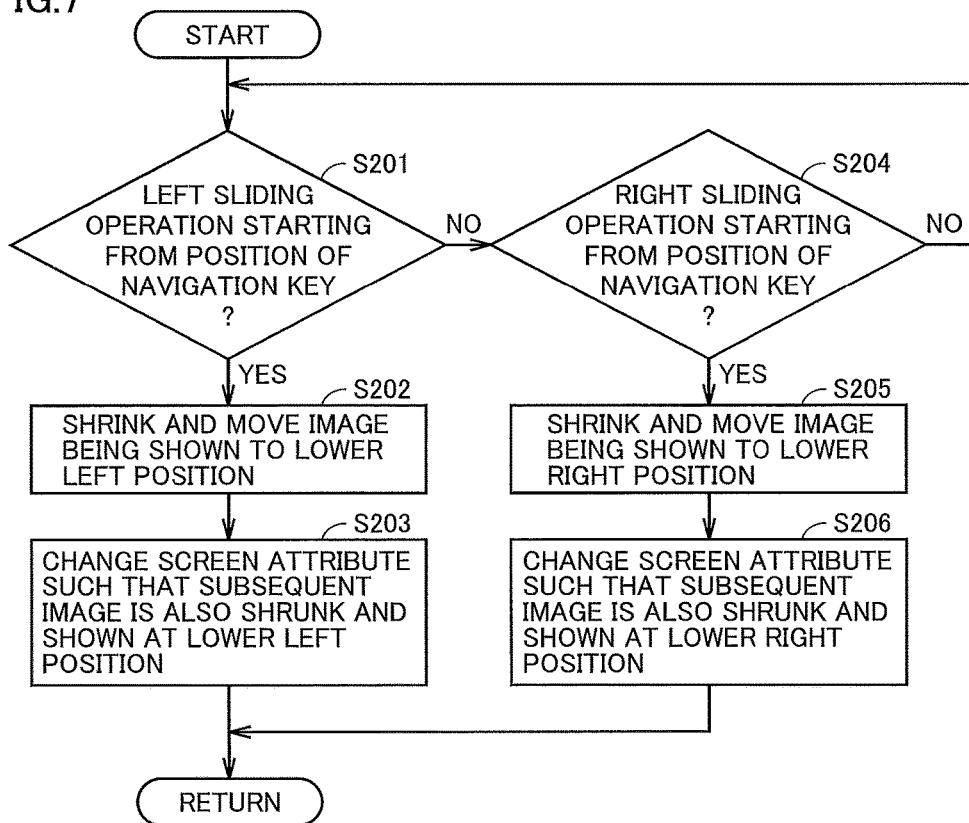
FIG. 7 is a flowchart showing an operation procedure according to a second embodiment.

FIG. 7 is a flowchart showing an operation procedure according to the second embodiment.

Referring to FIG. 7, in step S201, when a user executes a left sliding operation starting from a position of the navigation key on touch panel 8, the process proceeds into step S202.

In step S202, control unit 12 can shrink and move an image being shown to a lower left position in the showable area of display 7.

In step S203, control unit 12 can change the screen attribute such that an image to be shown subsequently is also shrunk and shown at the lower left position in the showable area of display 7.

In step S204, when a user executes a right sliding operation starting from the position of the navigation key on touch panel 8, the process proceeds into step S205.

In step S205, control unit 12 can shrink and move an image being shown to a lower right position in the showable area of display 7.

In step S206, control unit 12 can change the screen attribute such that an image to be shown subsequently is also shrunk and shown at the lower right position in the showable area of display 7.

Operation Example

Figure 8:
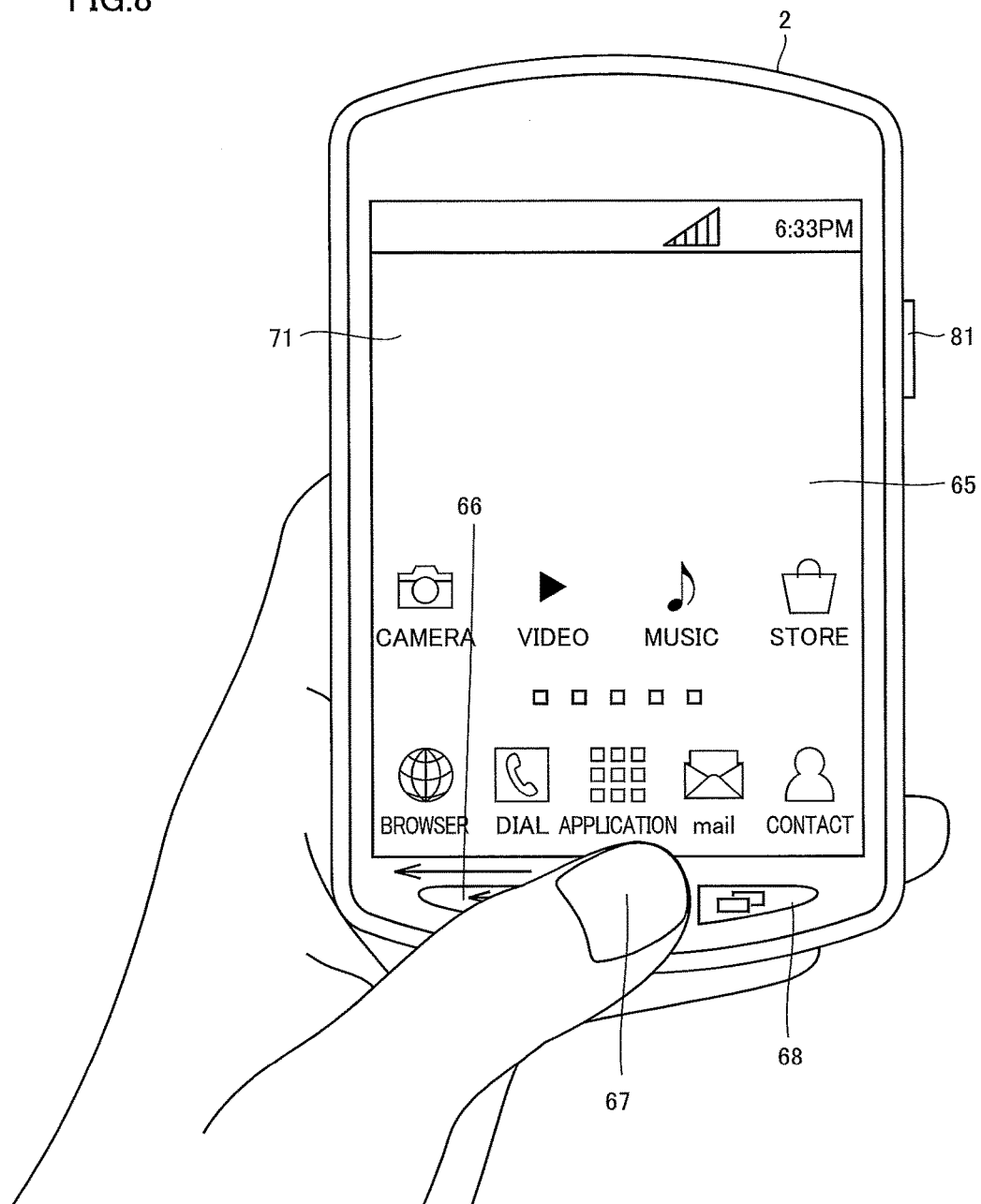
FIG. 8 shows a state when a user holds a mobile terminal with his/her left hand and has started an image shrinking operation in the second embodiment.

FIG. 8 shows a state when a user holds mobile terminal 2 with his/her left hand and has started an image shrinking operation in the second embodiment.

Referring to FIG. 8, image 71 is shown in showable area 65 of display 7. Since the navigation key is implemented by the electrostatic key in this example, a plurality of navigation keys are located outside and below showable area 65. A back key 66 is located on the left side. A home key 67 is located at the center. An application history key 68 is located on the right side.

When back key 66 is selected by a touch, a previous screen is shown. When home key 67 is selected by a touch, a home screen is shown. When application history key 68 is selected by a touch, the history of applications having been executed is shown.

Instead of application history key 68, a menu key for showing an optional menu may be located.

Even when tapped like the launcher icon, these navigation keys will not start up any applications. Because of such a characteristic, the navigation keys are suitable as icons for instructing image shrinking.

A user holds mobile terminal 2 with his/her left hand, and executes a left sliding operation starting from the left thumb with home key 67 among the plurality of navigation keys.

Figure 9:
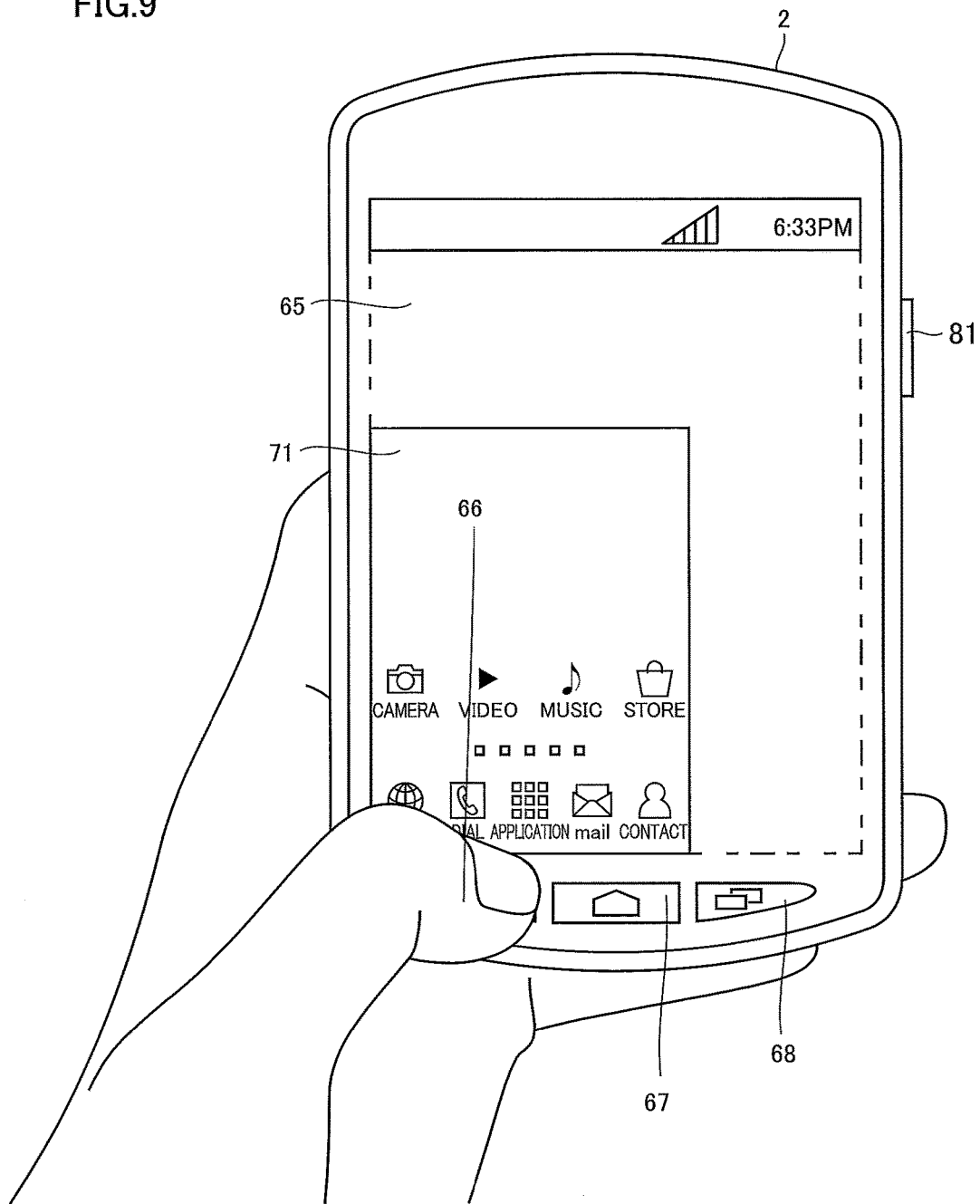
FIG. 9 shows a state when a user holds the mobile terminal with his/her left hand and has terminated the image shrinking operation in the second embodiment.

FIG. 9 shows a state when a user holds mobile terminal 2 with his/her left hand and has terminated the image shrinking operation in the second embodiment.

After the sliding operation described with reference to FIG. 8 is terminated, image 71 has been shrunk and is shown around the end point of the sliding operation in showable area 65, that is, at a lower left position, as shown in FIG. 9.

Figure 10:
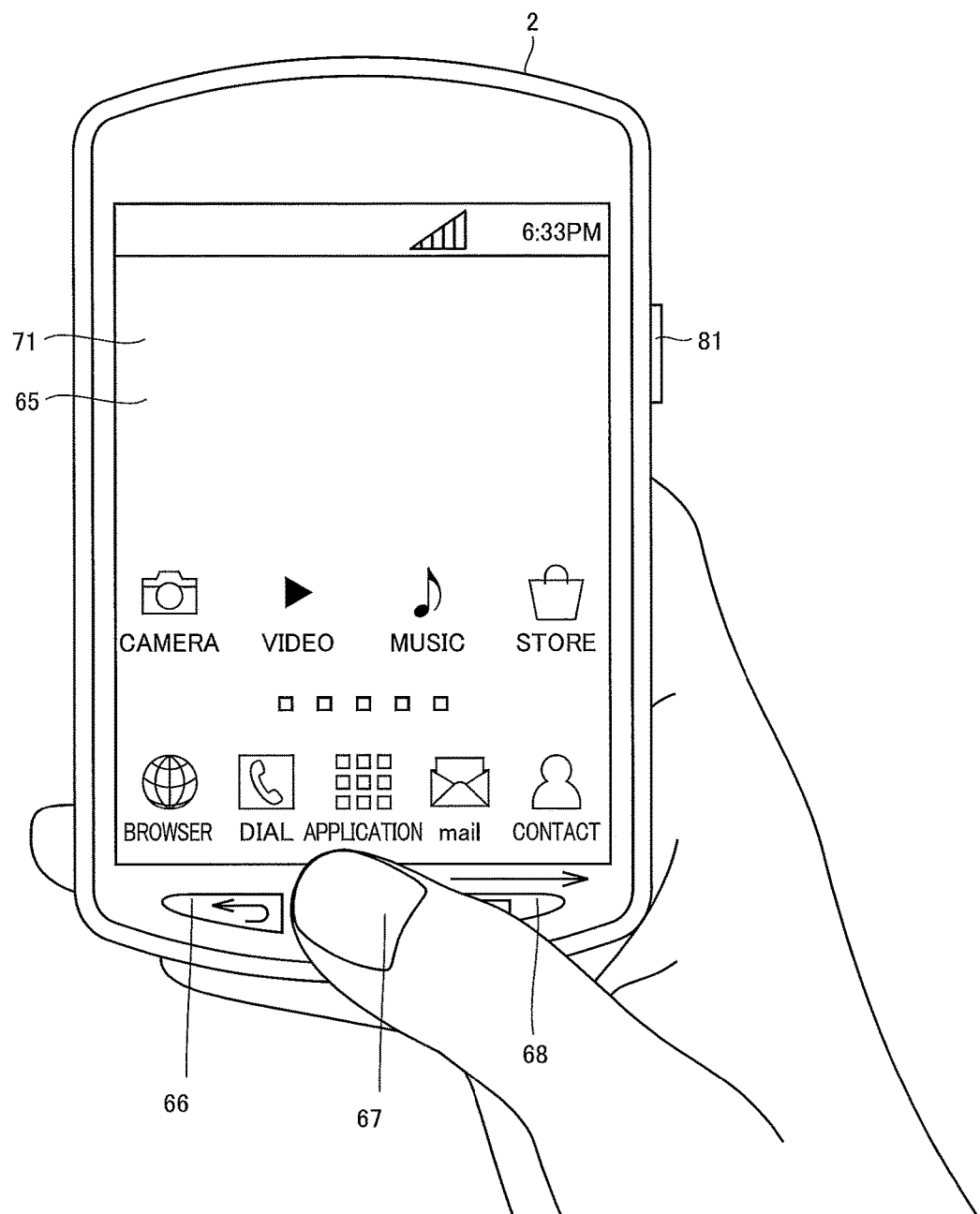
FIG. 10 shows a state when a user holds the mobile terminal with his/her right hand and has started the image shrinking operation in the second embodiment.

FIG. 10 shows a state when a user holds mobile terminal 2 with his/her right hand and has started the image shrinking operation in the second embodiment.

Referring to FIG. 10, image 71 is shown in showable area 65 of display 7. The plurality of navigation keys are located outside and below showable area 65. A user holds mobile terminal 2 with his/her right hand, and executes a right sliding operation with the right thumb starting from home key 67 among the plurality of navigation keys.

Figure 11:
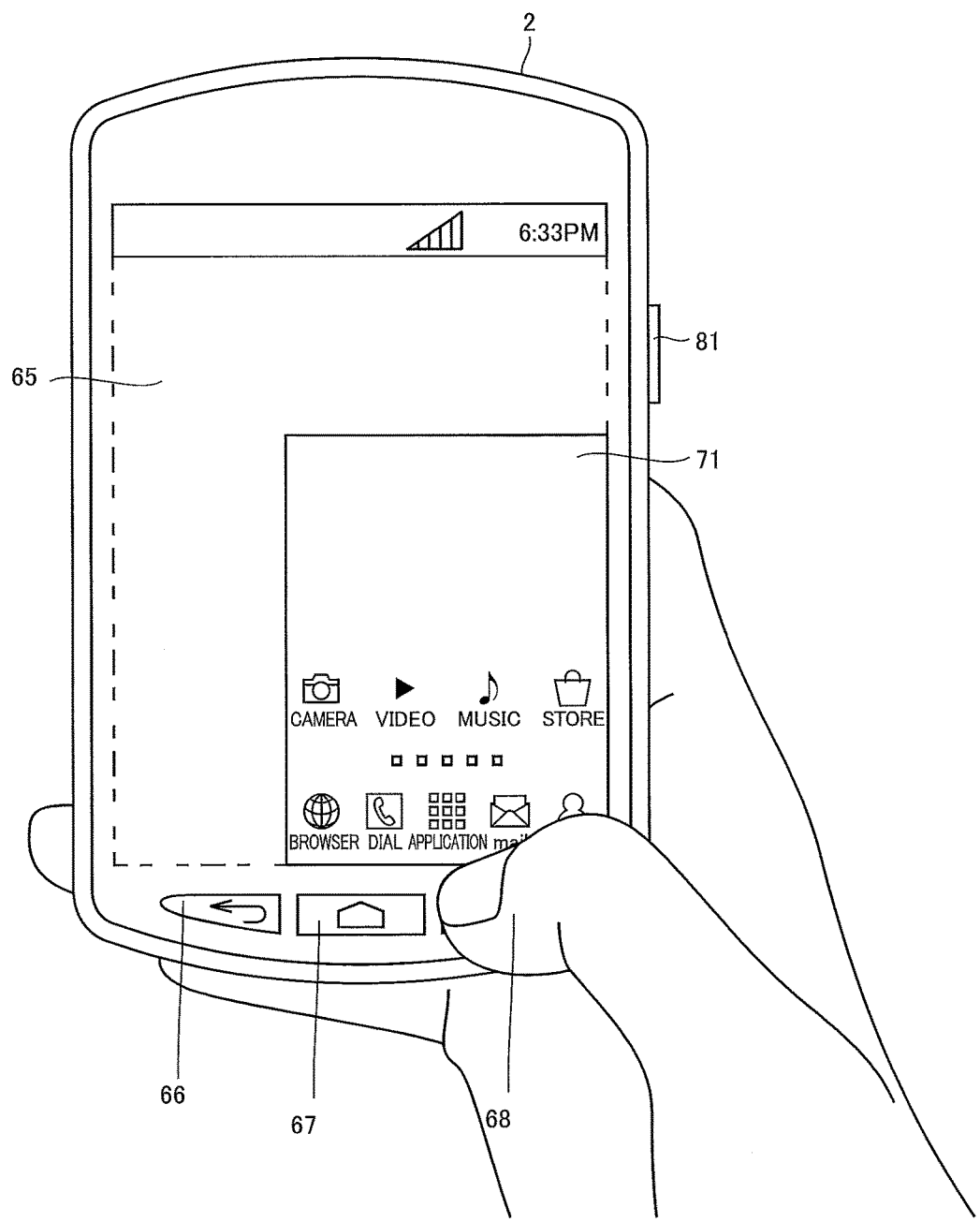
FIG. 11 shows a state when a user holds the mobile terminal with his/her right hand and has terminated the image shrinking operation in the second embodiment.

FIG. 11 shows a state when a user holds mobile terminal 2 with his/her right hand and has terminated the image shrinking operation in the second embodiment.

After the sliding operation described with reference to FIG. 10 is terminated, image 71 has been shrunk and is shown around the end point of the sliding operation in showable area 65, that is, at a lower right position, as shown in FIG. 11.

As described above, according to the second embodiment, an image is shrunk and moved to a lower left or lower right position by laterally sliding a navigation key suitable for instructing image shrinking. A user can thus touch an icon included in the shrunk image with one hand.

In the above-described operation example, an image shall be shrunk by a sliding operation starting from the home key among the plurality of navigation keys, this is not a limitation. An image may be shrunk by a sliding operation starting from any navigation key other than the home key. Alternatively, an image may be shrunk by a sliding operation starting from a navigation key located at the center among the plurality of navigation keys.

Third Embodiment

In a third embodiment, the left and right edges of the touch panel are used instead of the launcher folder icon or the navigation keys.

In the third embodiment, when a downward sliding operation starting from a certain position on the lateral edge of touch panel 8 is executed, control unit 12 can shrink and move an image being shown in a direction toward the end point of the sliding operation in the showable area.

(Operation)

Figure 12:
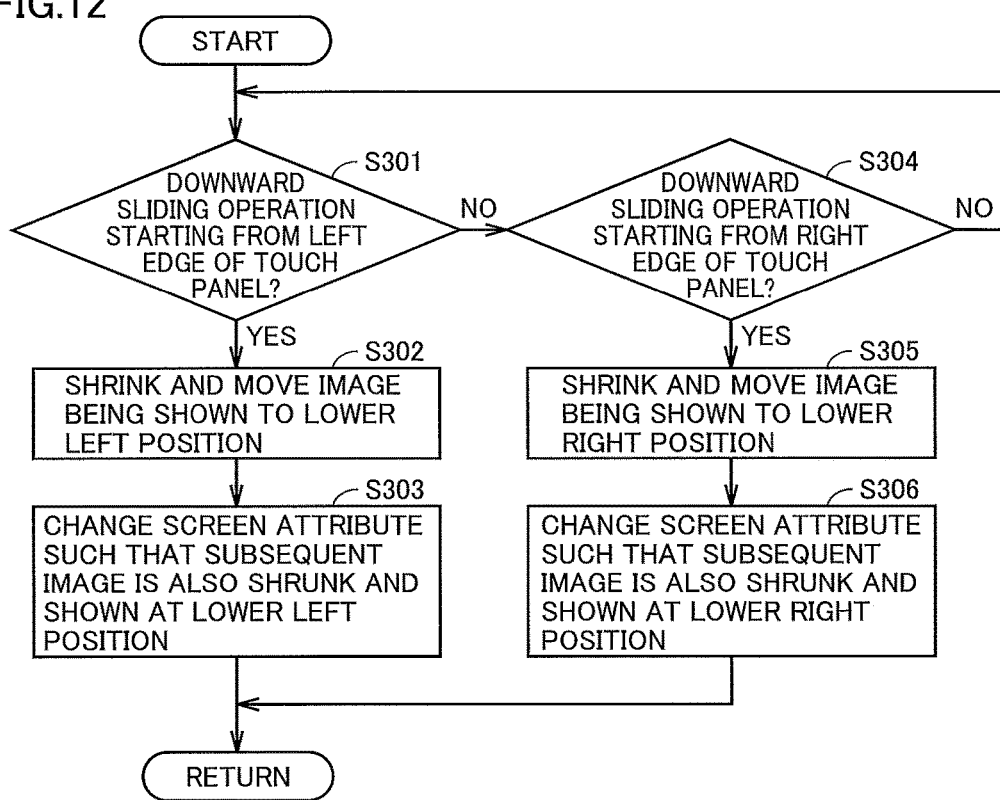
FIG. 12 is a flowchart showing an operation procedure according to a third embodiment.

FIG. 12 is a flowchart showing an operation procedure according to the third embodiment.

Referring to FIG. 12, in step S301, when a user executes a downward sliding operation starting from a certain position on the left edge of touch panel 8, the process proceeds into step S302.

In step S302, control unit 12 can shrink and move an image being shown to a lower left position in the showable area of display 7.

In step S303, control unit 12 can change the screen attribute such that an image to be shown subsequently is also shrunk and shown at the lower left position in the showable area of display 7.

In step S304, when a user executes a downward sliding operation starting from a certain position on the right edge of touch panel 8, the process proceeds into step S305.

In step S305, control unit 12 can shrink and move an image being shown to a lower right position in the showable area of display 7.

In step S306, control unit 12 can change the screen attribute such that an image to be shown subsequently is also shrunk and shown at the lower right position in the showable area of display 7.

Operation Example

Figure 13:
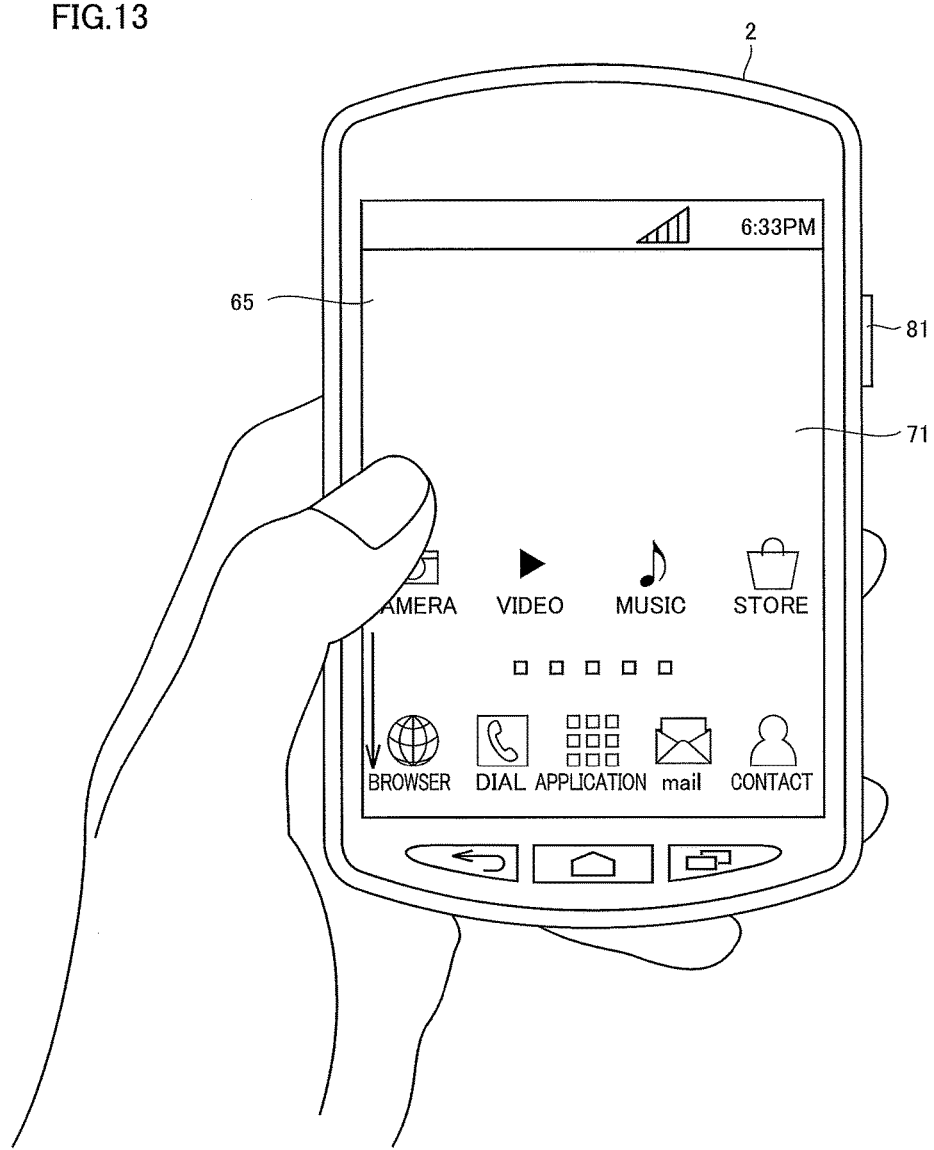
FIG. 13 shows a state when a user holds a mobile terminal with his/her left hand and has started an image shrinking operation in the third embodiment.

FIG. 13 shows a state when a user holds mobile terminal 2 with his/her left hand and has started an image shrinking operation in the third embodiment.

Referring to FIG. 13, image 71 is shown in showable area 65 of display 7. A user holds mobile terminal 2 with his/her left hand, and executes a downward sliding operation with the left thumb starting from a certain position on the left edge of touch panel 8.

Figure 14:
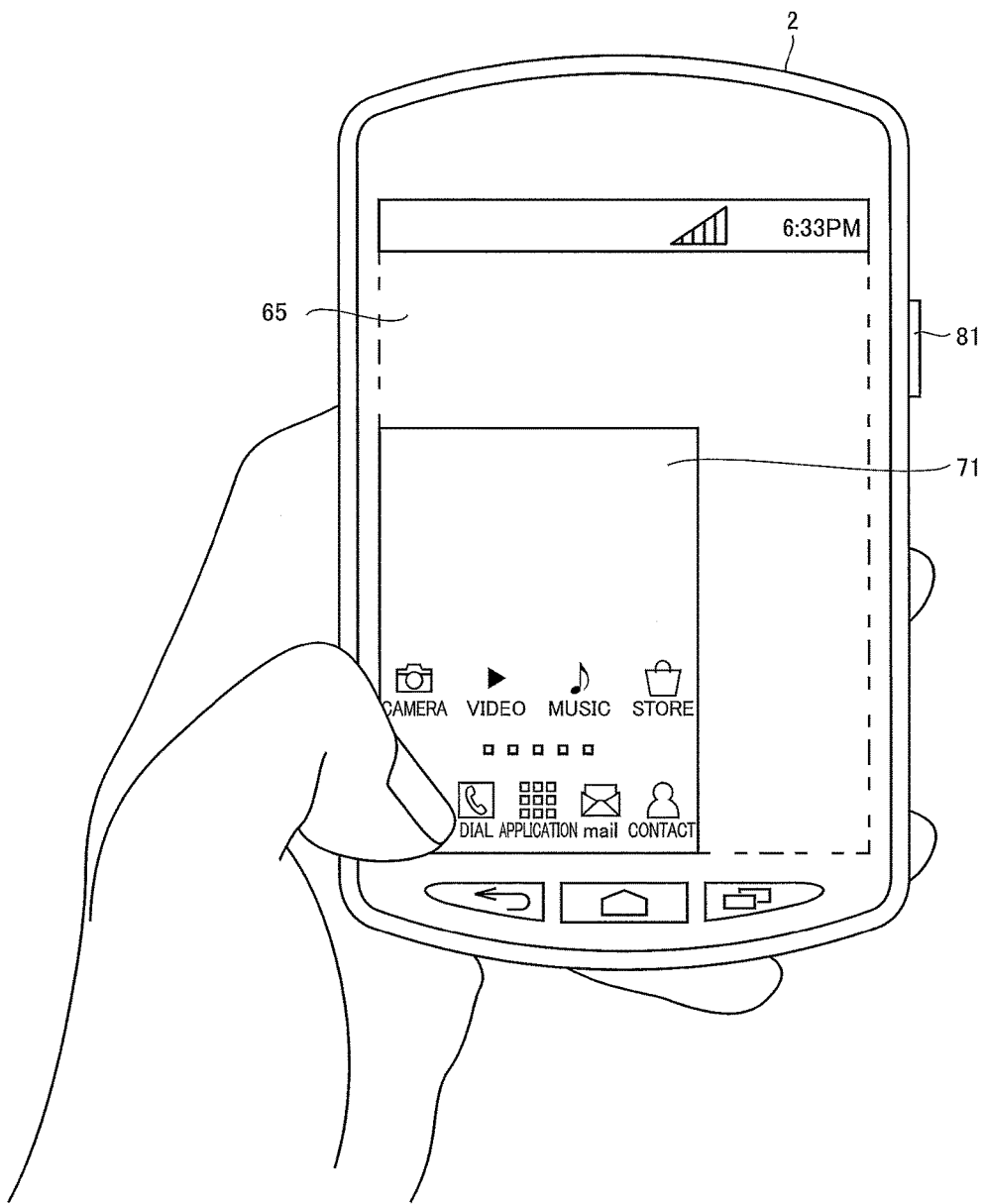
FIG. 14 shows a state when a user holds the mobile terminal with his/her left hand and has terminated the image shrinking operation in the third embodiment.

FIG. 14 shows a state when a user holds mobile terminal 2 with his/her left hand and has terminated the image shrinking operation in the third embodiment.

After the sliding operation described with reference to FIG. 13 is terminated, image 71 has been shrunk and is shown around the end point of the sliding operation in showable area 65, that is, at a lower left position, as shown in FIG. 14.

Figure 15:
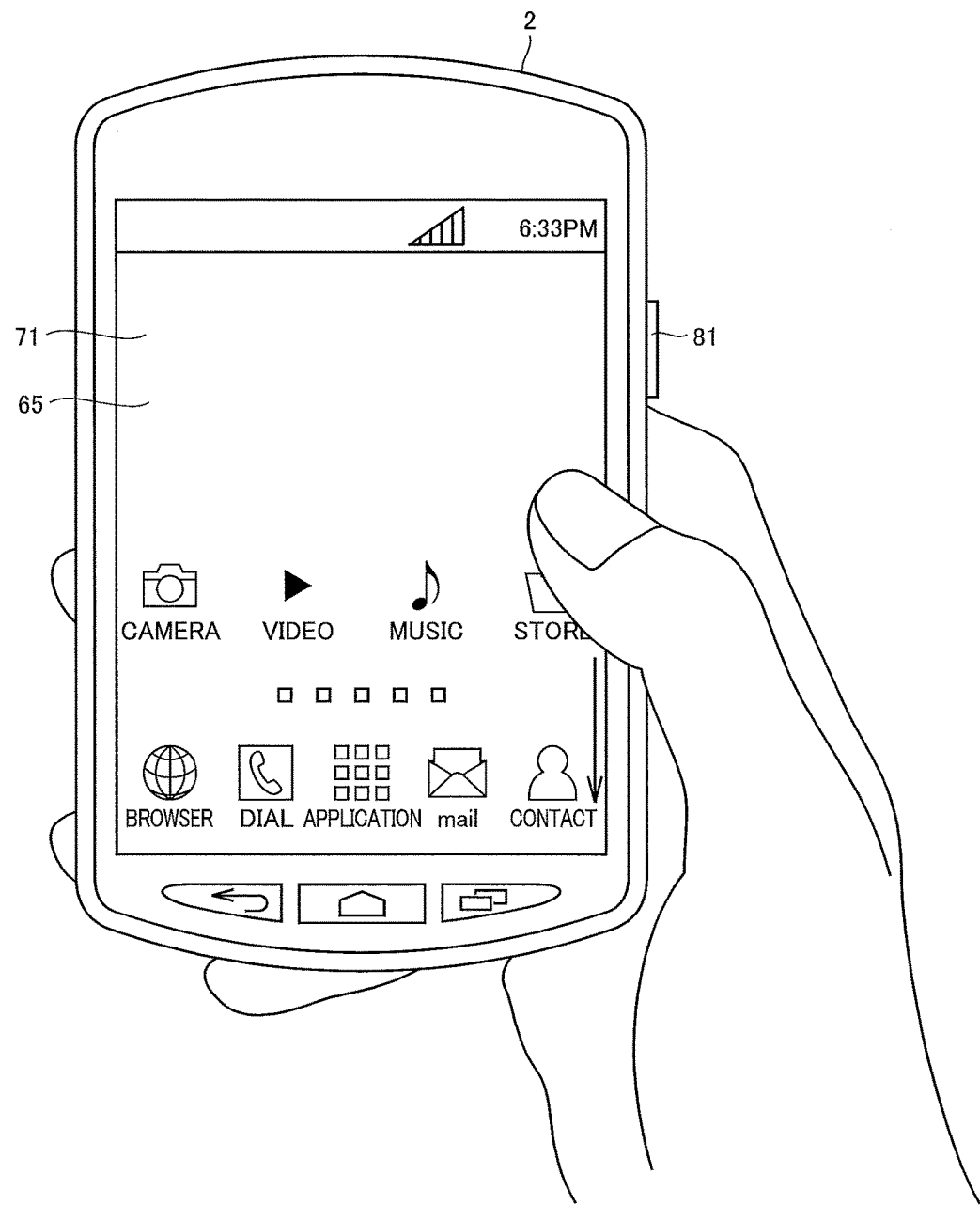
FIG. 15 shows a state when a user holds the mobile terminal with his/her right hand and has started the image shrinking operation in the third embodiment.

FIG. 15 shows a state when a user holds mobile terminal 2 with his/her right hand and has started the image shrinking operation in the third embodiment.

Referring to FIG. 15, image 71 is shown in showable area 65 of display 7. A user holds mobile terminal 2 with his/her right hand, and executes a downward sliding operation with the right thumb starting from a certain position on the right edge of touch panel 8.

Figure 16:
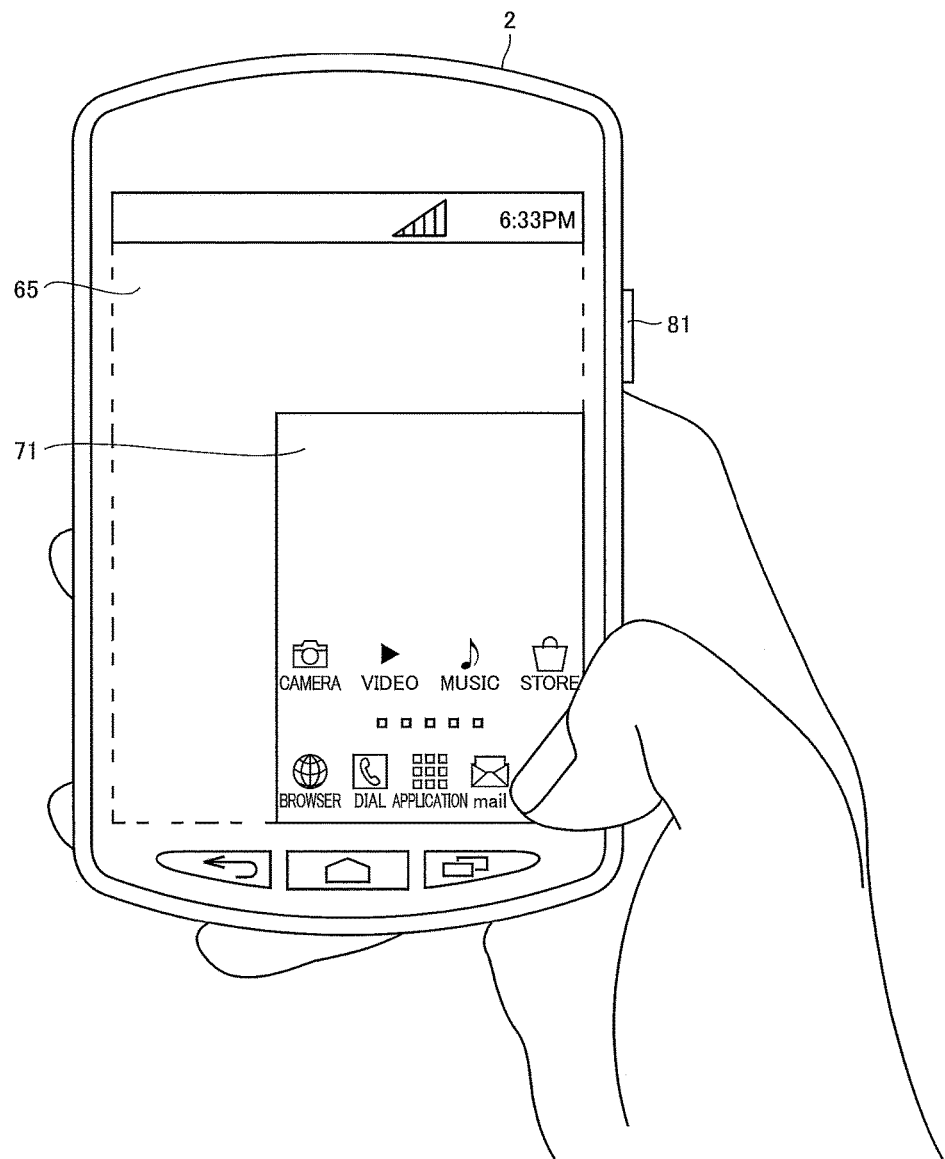
FIG. 16 shows a state when a user holds the mobile terminal with his/her right hand and has started the image shrinking operation in the third embodiment.

FIG. 16 shows a state when a user holds mobile terminal 2 with his/her right hand and has started the image shrinking operation in the third embodiment.

After the sliding operation described with reference to FIG. 15 is terminated, image 71 has been shrunk and is shown around the end point of the sliding operation in showable area 65, that is, at a lower right position, as shown in FIG. 16.

As described above, according to the third embodiment, an image is shrunk and moved to a lower left or lower right position by downwardly sliding an edge of the touch panel suitable for instructing image shrinking. A user can thus touch an icon included in the shrunk image with one hand.

Fourth Embodiment

A mobile terminal of a fourth embodiment has a function of enlarging an image to its original size in addition to the function of shrinking an image according to the third embodiment.

Similarly to the third embodiment, control unit 12 of the fourth embodiment can show a shrunk image at a lower left position, and when an upward sliding operation starting from a certain position on the left edge of touch panel 8 is executed after a shrunk image is shown at the lower left position, can enlarge the shrunk image to the image size before shrinking and move the enlarged image to the position before the shrinking.

Similarly to the third embodiment, control unit 12 can show a shrunk image at a lower right position, and when an upward sliding operation starting from a certain position on the right edge of touch panel 8 is executed after a shrunk image is shown at the lower right position, can enlarge the shrunk image to the image size before shrinking and move the enlarged image to the position before the shrinking.

Figure 17:
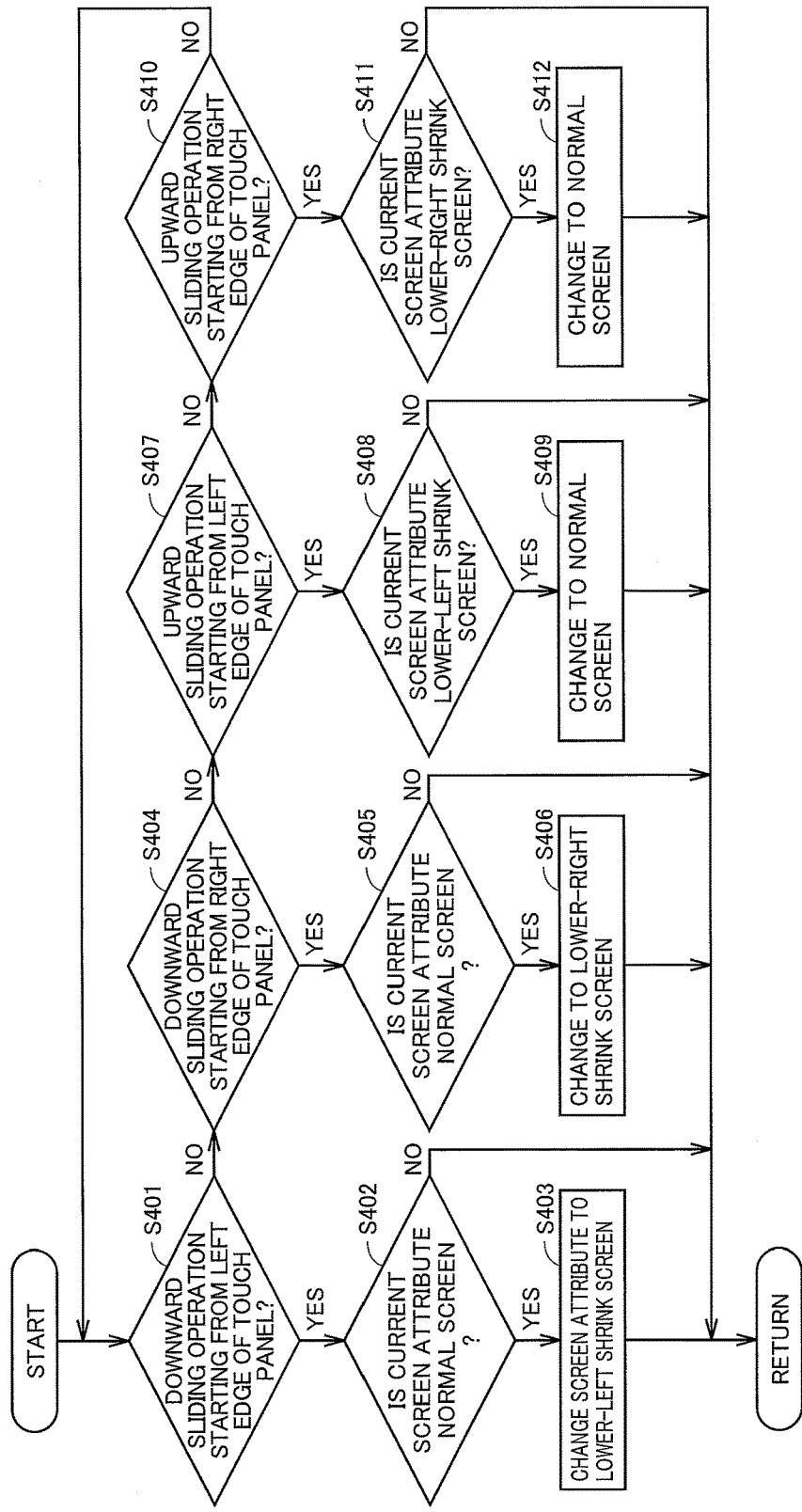
FIG. 17 is a flowchart showing an operation procedure according to a fourth embodiment.

FIG. 17 is a flowchart showing an operation procedure according to the fourth embodiment.

Referring to FIG. 17, when a user executes a downward sliding operation starting from a certain position on the left edge of touch panel 8, the process proceeds into step S402.

In step S402, when the current screen attribute is a normal screen, control unit 12 advances the process to step S403, and when the current screen attribute is not the normal screen, terminates the process.

In step S403, control unit 12 can change the screen attribute to the lower-left shrink screen. When the screen attribute is changed to the lower-left shrink screen, control unit 12 can shrink an image being shown and move the image to a lower left position in the showable area of display 7, and can also shrink an image to be shown subsequently and show the image at the lower left position in the showable area of display 7.

In step S404, when a user executes a downward sliding operation starting from a certain position on the right edge of touch panel 8, the process proceeds into step S405.

In step S405, when the current screen attribute is the normal screen, control unit 12 advances the process to step S406, and when the current screen attribute is not the normal screen, terminates the process.

In step S406, control unit 12 can change the screen attribute to the lower-right shrink screen. When the screen attribute is changed to the lower-right shrink screen, control unit 12 can shrink an image being shown and move the image to a lower right position in the showable area of display 7, and can also shrink an image to be shown subsequently and show the image at the lower right position in the showable area of display 7.

In step S407, when a user executes an upward sliding operation starting from a certain position on the left edge of touch panel 8, the process proceeds into step S408.

In step S408, when the current screen attribute is the lower-left shrink screen, control unit 12 advances the process to step S409, and when the current screen attribute is not the lower-left shrink screen, terminates the process.

In step S409, control unit 12 can change the screen attribute to the normal screen. When the screen attribute is changed to the normal screen, control unit 12 can enlarge an image being shown to a normal size and move the image to the normal position in the showable area of display 7, and can also show an image to be shown subsequently at the normal position in the showable area of display 7 without shrinking.

In step S410, when a user executes an upward sliding operation starting from a certain position on the right edge of touch panel 8, the process proceeds into step S411.

In step S411, when the current screen attribute is the lower-right shrink screen, control unit 12 advances the process to step S412, and when the current screen attribute is not the lower-right shrink screen, terminates the process.

In step S412, control unit 12 can change the screen attribute to the normal screen. When the screen attribute is changed to the normal screen, control unit 12 can enlarge an image being shown to a normal size and move the image to the normal position in the showable area of display 7, and can also cause a subsequent image to be shown at the normal position in the showable area of display 7 without shrinking.

Operation Example

Figure 18:
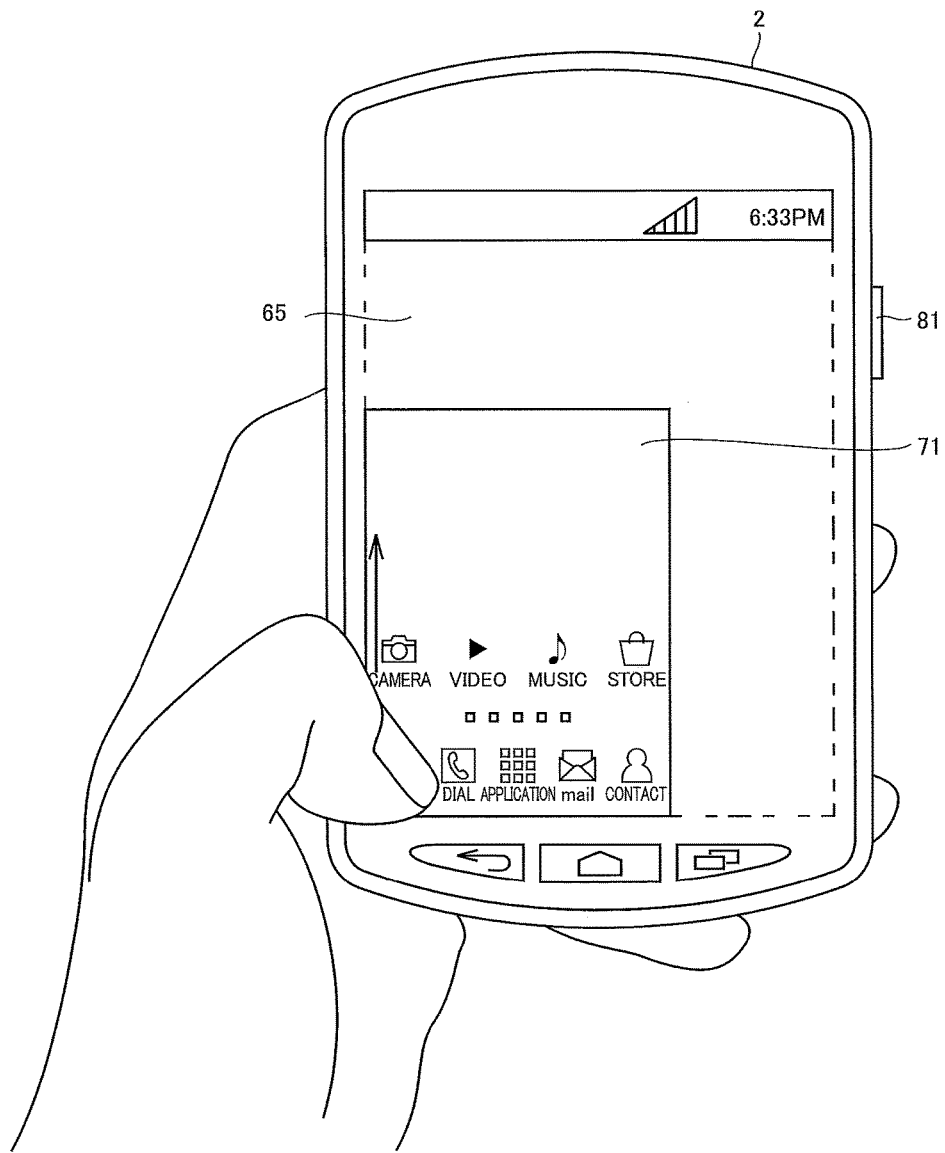
FIG. 18 shows a state when a user holds a mobile terminal with his/her left hand and has started an operation of enlarging an image to a normal size in the fourth embodiment.

FIG. 18 shows a state when a user holds mobile terminal 2 with his/her left hand and has started an operation of enlarging an image to a normal size in the fourth embodiment.

Referring to FIG. 18, shrunk image 71 is shown at a lower left position in showable area 65 of display 7. A user holds mobile terminal 2 with his/her left hand, and executes an upward sliding operation with the left thumb starting from a certain position on the left edge of touch panel 8.

Figure 19:
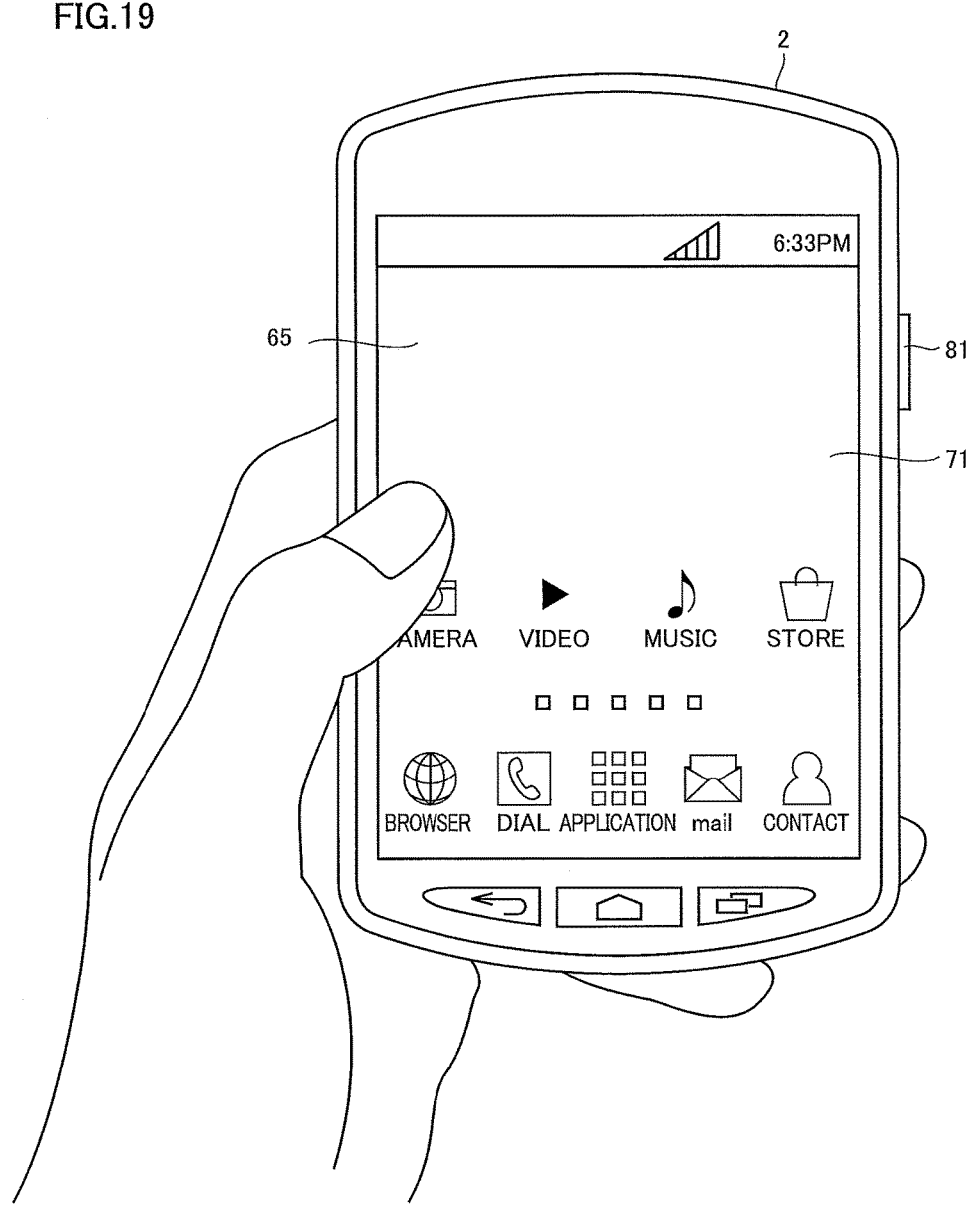
FIG. 19 shows a state when a user holds the mobile terminal with his/her left hand and has terminated the operation of enlarging the image to the normal size in the fourth embodiment.

FIG. 19 shows a state when a user holds mobile terminal 2 with his/her left hand and has terminated the operation of enlarging the image to the normal size in the fourth embodiment.

After terminating the sliding operation described with reference to FIG. 18, image 71 is enlarged and shown at the normal position in showable area 65, as shown in FIG. 19.

Figure 20:
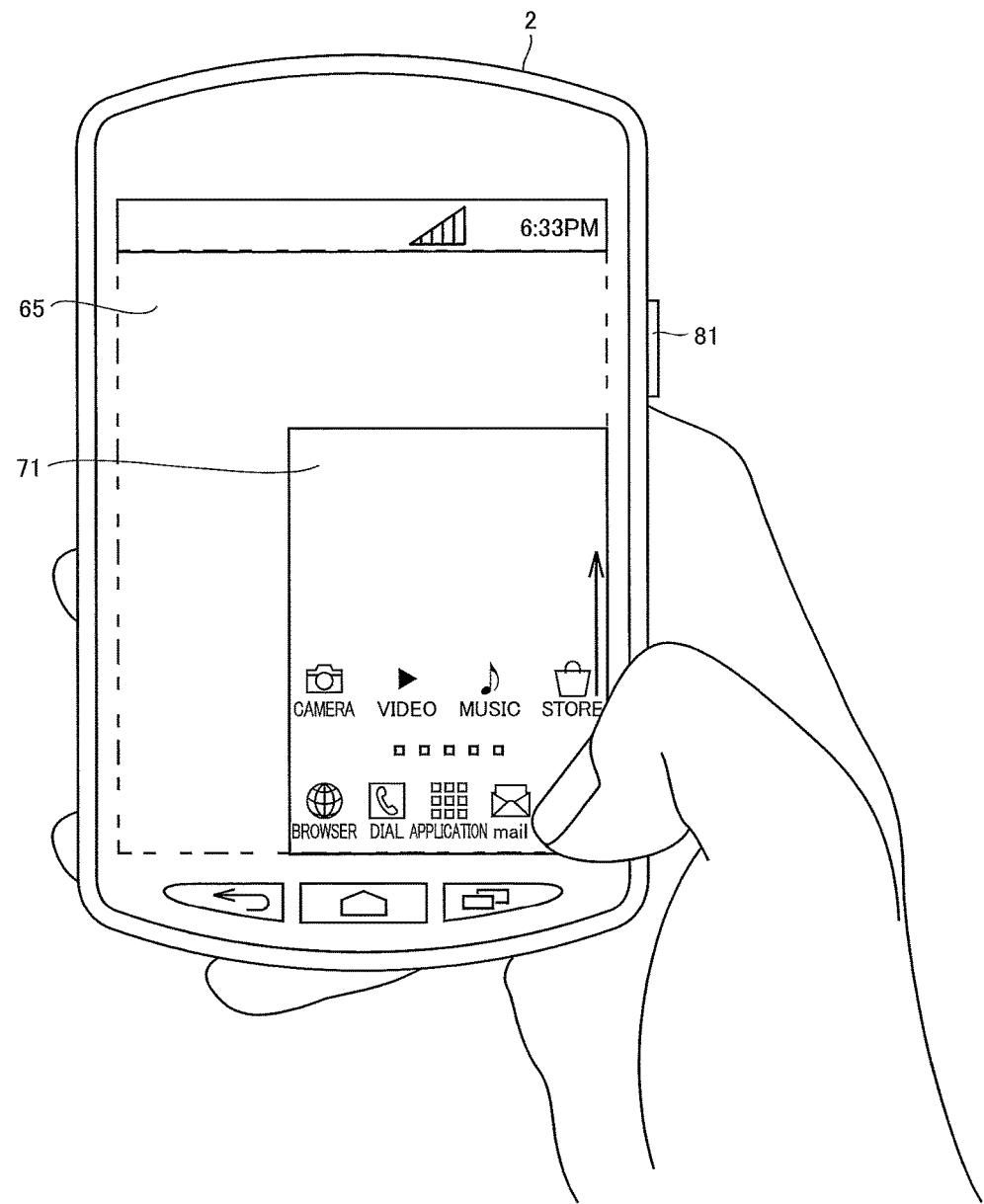
FIG. 20 shows a state when a user holds the mobile terminal with his/her right hand and has started the operation of enlarging an image to a normal size in the fourth embodiment.

FIG. 20 shows a state when a user holds mobile terminal 2 with his/her right hand and has started an operation of enlarging an image to a normal size in the fourth embodiment.

Referring to FIG. 20, shrunk image 71 is shown at a lower right position in showable area 65 of display 7. A user holds mobile terminal 2 with his/her right hand, and executes an upward sliding operation with the right thumb starting from a certain position on the right edge of touch panel 8.

Figure 21:
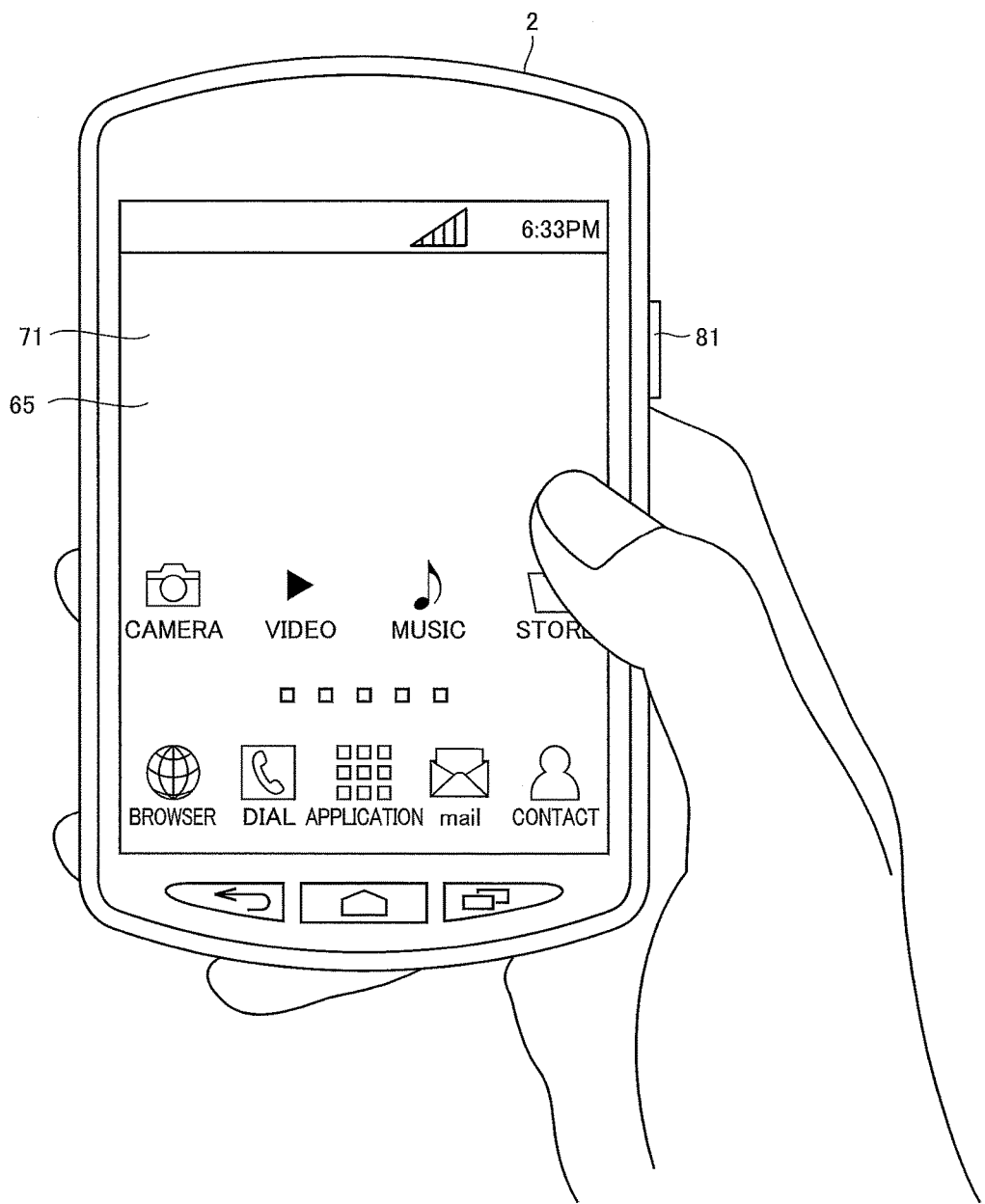
FIG. 21 shows a state when a user holds the mobile terminal with his/her right hand and has terminated the operation of enlarging the image to the normal size in the fourth embodiment.

FIG. 21 shows a state when a user holds mobile terminal 2 with his/her right hand and has terminated the operation of enlarging the image to the normal size in the fourth embodiment.

After terminating the sliding operation described with reference to FIG. 20, image 71 is enlarged and shown at the normal position in showable area 65, as shown in FIG. 21.

As described above, according to the fourth embodiment, by performing a downward sliding operation starting from a certain position on the left edge or right edge of the touch panel to show a shrunk image, and then performing an upward sliding operation starting from a certain position on the left edge or right edge of the touch panel, the image can be returned to its original size and position.

Fifth Embodiment

A mobile terminal of a fifth embodiment has a function of allowing a user to set the ratio in showing a shrunk image in the first to fourth embodiments.

In a user setting, control unit 12 of the fifth embodiment sets the shrink ratio for shrinking an image and a screen area thereof based on a touch position on touch panel 8 where a user has touched.

(Operation)

Figure 22:
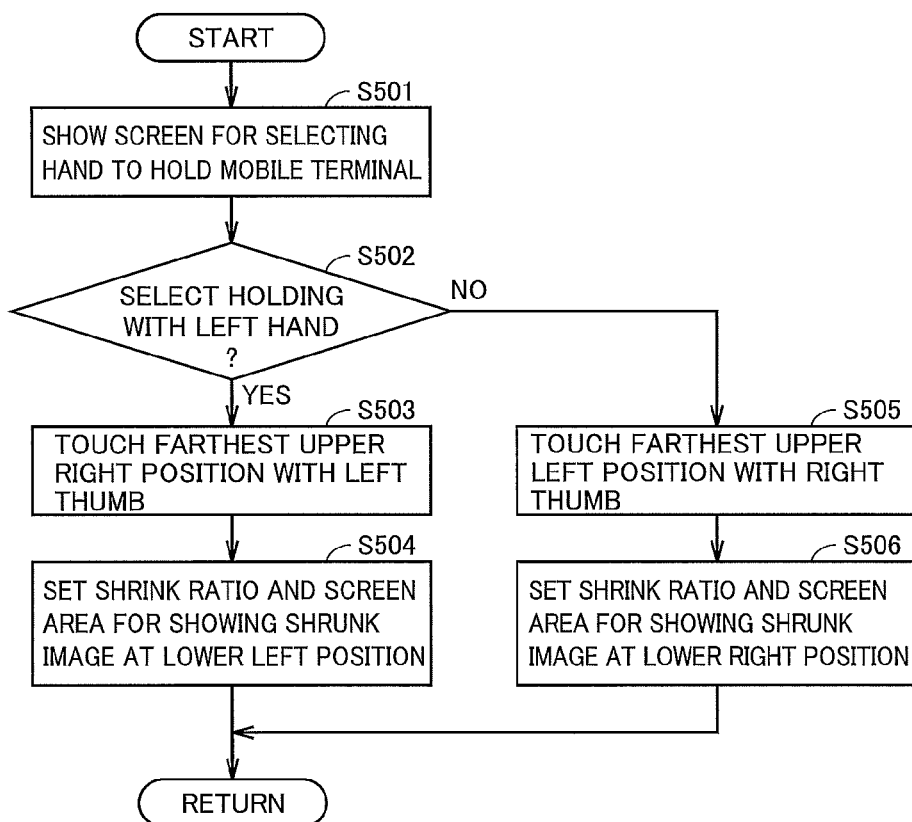
FIG. 22 is a flowchart showing an operation procedure according to a fifth embodiment.

FIG. 22 is a flowchart showing an operation procedure according to the fifth embodiment.

In step S501, control unit 12 can cause an image for selecting the left hand or the right hand to hold mobile terminal 1 to be shown.

In step S502, when a user selects the left hand, the process proceeds into step S503, and when the user selects the right hand, the process proceeds into step S505.

In step S503, control unit 12 instructs the user to touch the farthest position that he/she can touch with the left thumb on the diagonal line connecting the lower left corner and the upper right corner of the showable area. Control unit 12 obtains a position P1 touched by the user.

In step S504, based on obtained position P1, control unit 12 calculates the image shrink ratio when showing a shrunk image at a lower left position, and sets the screen area as a rectangular area with its lower left position located at the lower left corner of the showable area and its upper right position located at position P1.

In step S505, control unit 12 instructs the user to touch the farthest position that he/she can touch with the right thumb on the diagonal line connecting the lower right corner and the upper left corner of the showable area. Control unit 12 obtains a position P2 touched by the user.

In step S506, based on obtained position P2, control unit 12 calculates the image shrink ratio when showing a shrunk image at a lower right position, and sets the screen area as a rectangular area with its lower right position located at the lower right corner of the showable area and its upper left position located at position P2.

Operation Example

Figure 23:
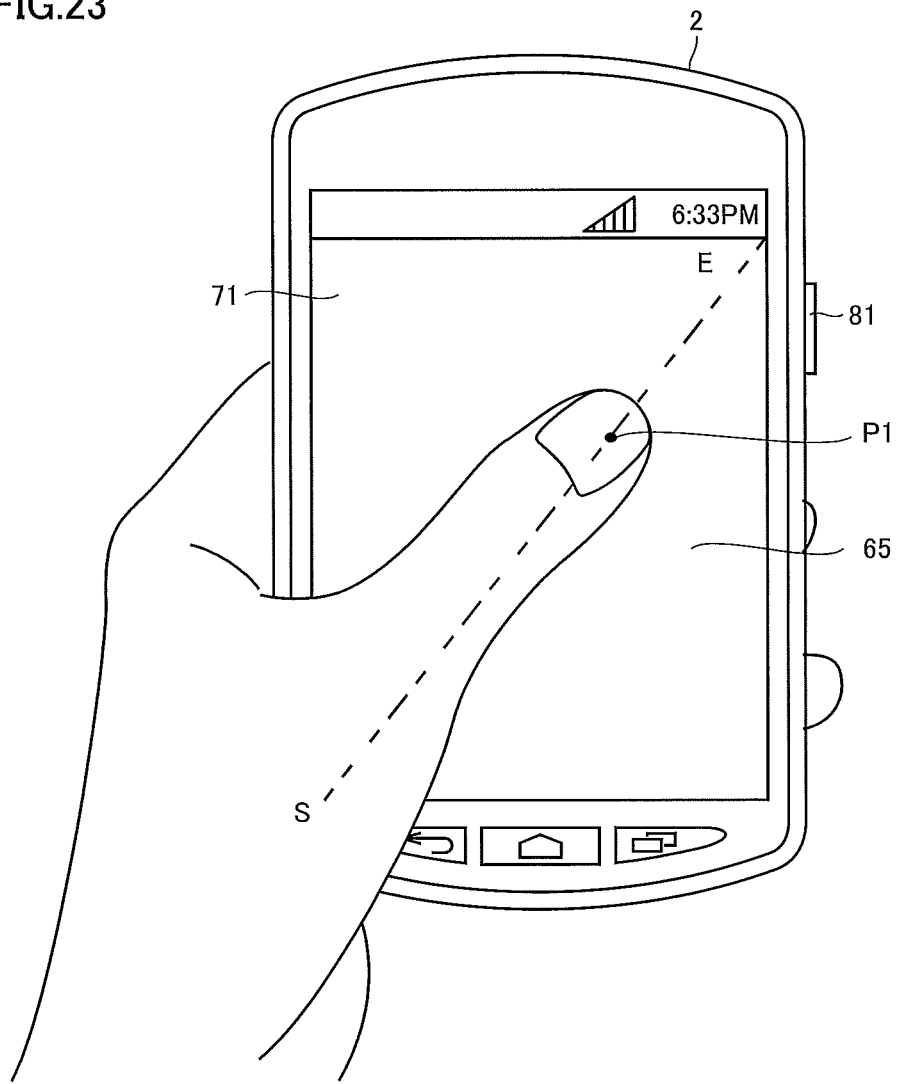
FIG. 23 shows a state where a user holds a mobile terminal with his/her left hand and sets a shrink ratio and a showable area when showing a shrunk image at a lower left position in the fifth embodiment.

FIG. 23 shows a state where a user holds mobile terminal 2 with his/her left hand and sets a shrink ratio and a showable area when showing a shrunk image at a lower left position in the fifth embodiment.

Referring to FIG. 23, the user holds mobile terminal 2 with his/her left hand, and touches the farthest position that he/she can touch with the left thumb on the diagonal line connecting lower left corner S and upper right corner E of showable area 65. The touch position is denoted by position P1. Denoting the distance between S and P1 by X and the distance between S and E by Y, a shrink ratio R is obtained by dividing X by Y.

Figure 24:
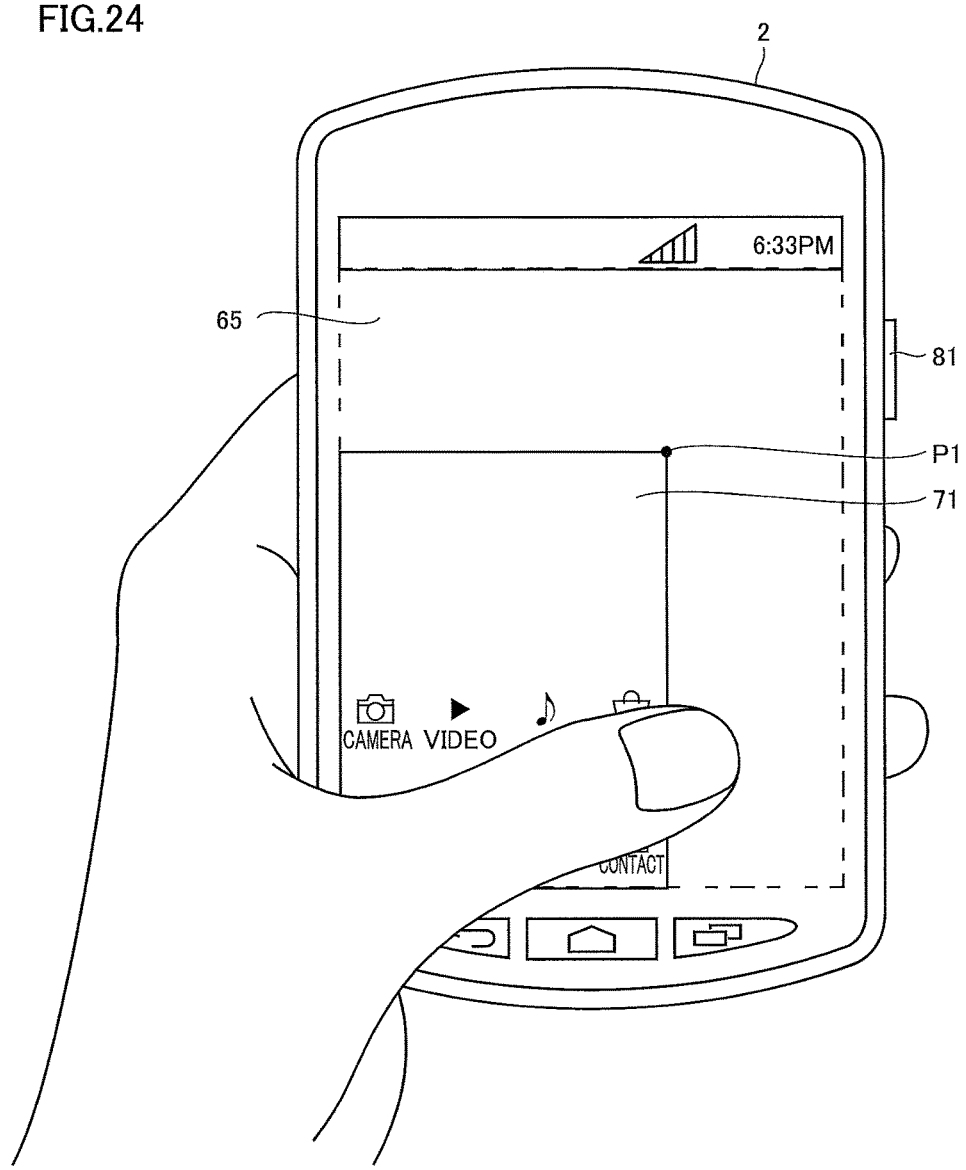
FIG. 24 shows a state when a user holds the mobile terminal with his/her left hand and has terminated the image shrinking operation in the fifth embodiment.

FIG. 24 shows a state when a user holds mobile terminal 2 with his/her left hand and has terminated the image shrinking operation in the fifth embodiment.

When showing a shrunk image at a lower left position, an image shrunk in shrink ratio R is shown in a rectangular area with its lower left position located at lower left corner P of showable area 65 and its upper right position located at position P1.

(Variations)

The present disclosure is not limited to the above-described embodiments, but also includes the following variations, for example.

(1) Shrink Display Function

In the first to fifth embodiments described above, the mobile terminal shall have both the image lower-left shrink screen function and the image lower-right shrink screen function, but may only have either of the functions.

(2) Display in Intermediate Stage of Sliding Operation

An image shall be shrunk and moved after the termination of a sliding operation in the above-described embodiments, but this is not a limitation. The end position of a sliding operation may be determined in advance, and in the course of a sliding operation, an image may be shrunk in a shrink ratio in accordance with the ratio of the distance between the starting point (origin) and an intermediate point to the distance between the starting point and the end point and moved.

Figure 25A:
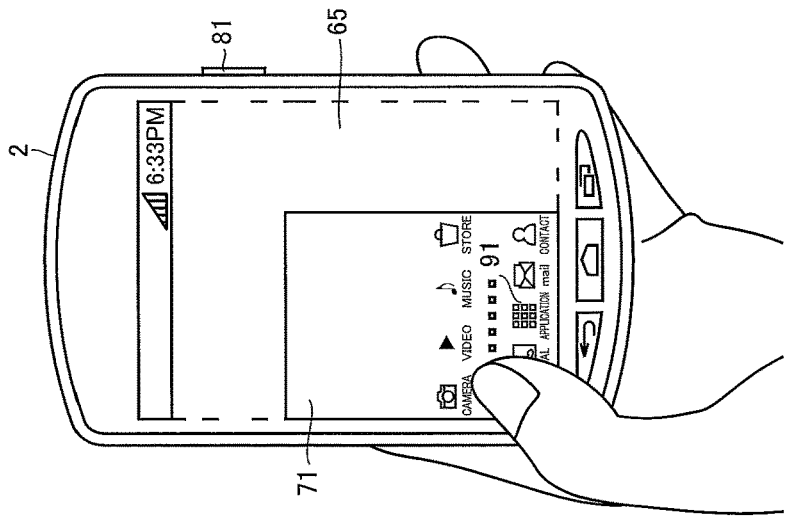
FIG. 25A shows an image shown at the start of a sliding operation according to a variation.
Figure 25B:
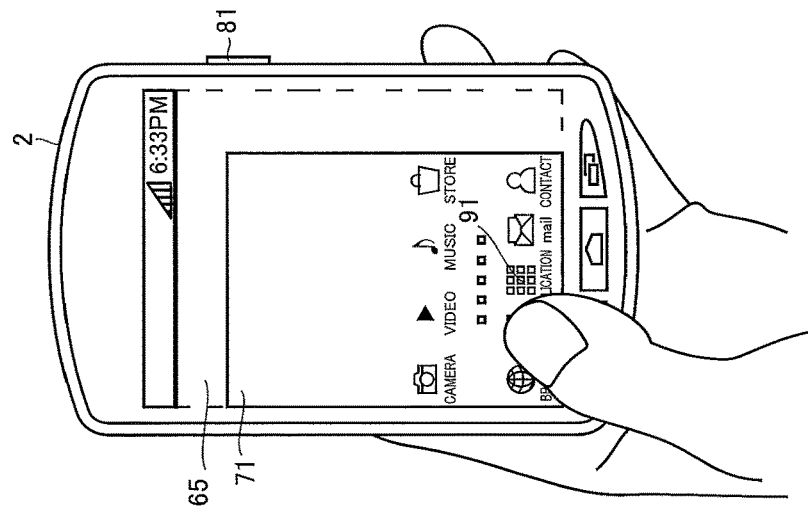
FIG. 25B shows an image shown in the course of the sliding operation according to the variation.
Figure 25C:
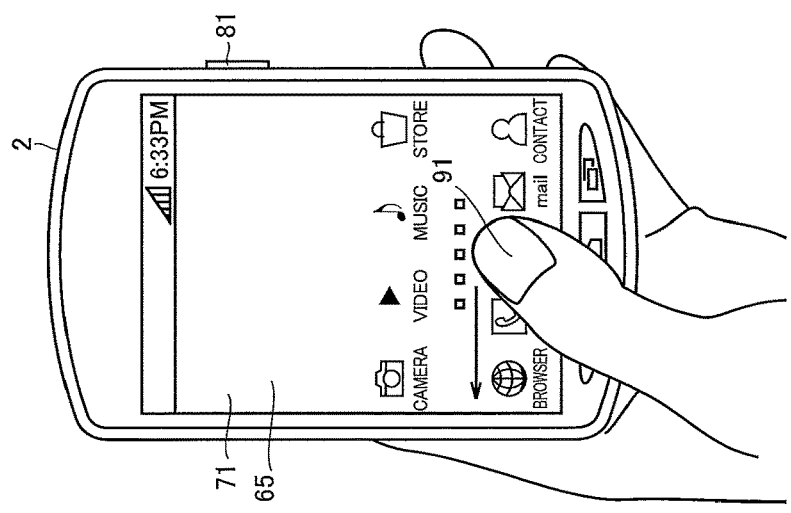
FIG. 25C shows an image shown at the end of the sliding operation according to the variation.

FIG. 25A shows an image shown at the start of a sliding operation. FIG. 25B shows an image shown in the course of the sliding operation. FIG. 25C shows an image shown at the end of the sliding operation.

As shown in these drawings, the image shrink ratio increases gradually with the progress of a sliding operation.

(3) Downward Sliding Operation

In the third embodiment, a shrunk image is shown at a lower left or lower right position by performing a downward sliding operation starting from a certain position on the right edge or the left edge of the touch panel, but this is not a limitation.

For example, when a downward sliding operation is performed starting from any position on the touch panel where no icon is located, an image being shown may be shrunk and moved in a direction toward the end point of the sliding operation in the showable area.

Figure 26:
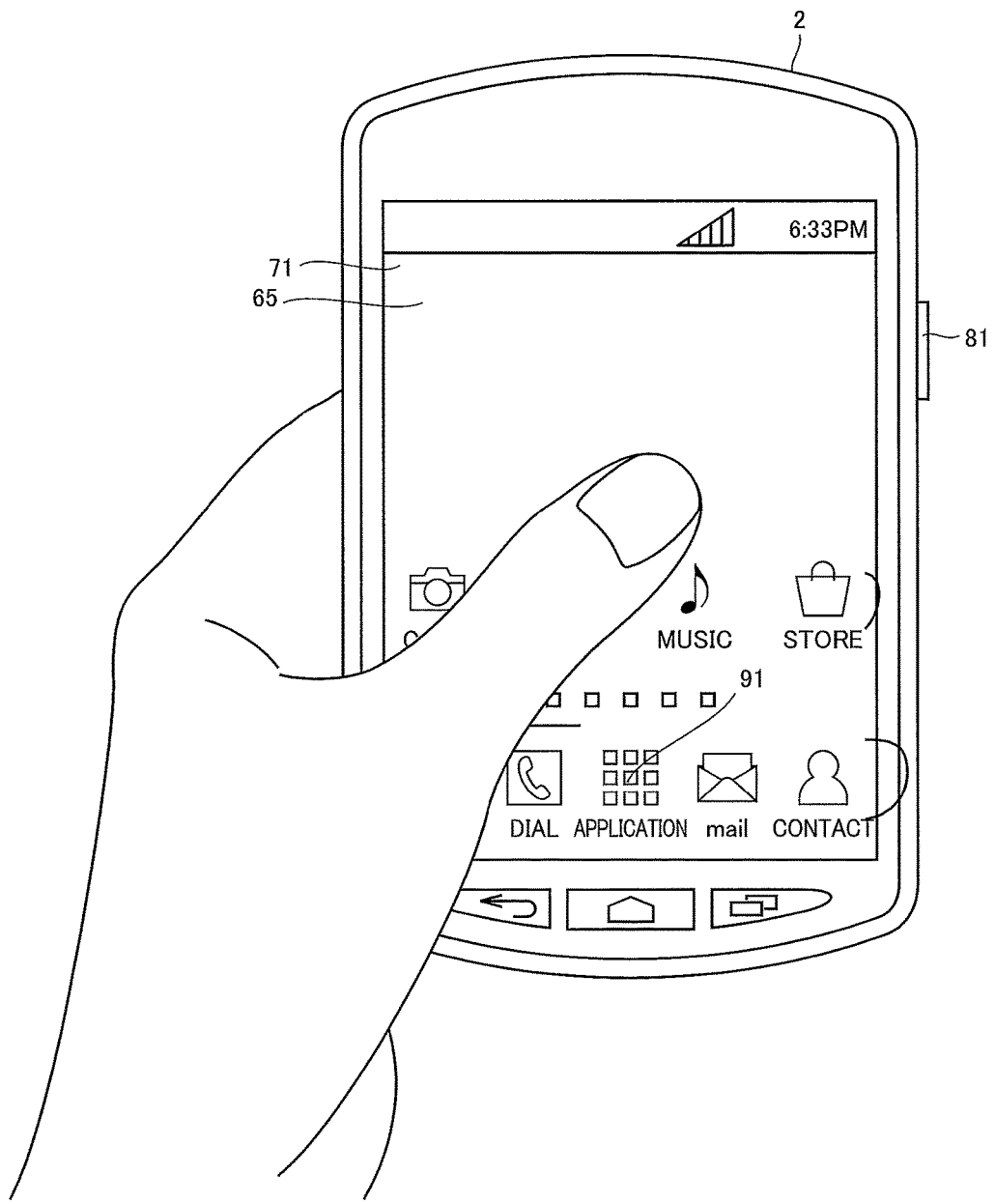
FIG. 26 shows an image shown at the start of a sliding operation according to a variation.
Figure 27:
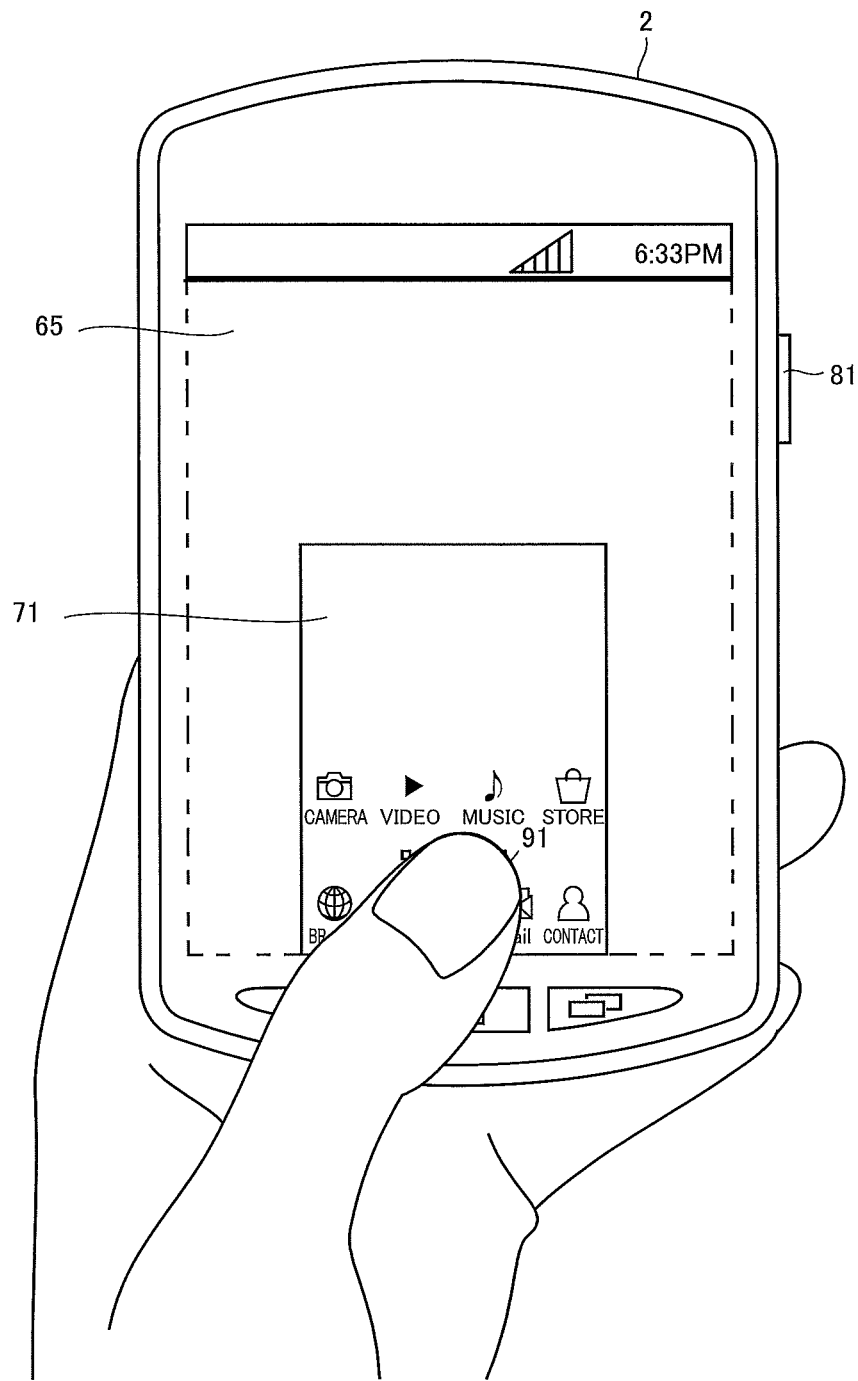
FIG. 27 shows an image shown at the end of the sliding operation according to the variation.

FIG. 26 shows an image shown at the start of a sliding operation. FIG. 27 shows an image shown at the end of the sliding operation.

As shown in FIG. 26, a sliding operation is started from a position on the touch panel where no icon is located.

As shown in FIG. 27, after the sliding operation is terminated, the image being shown has been shrunk and moved toward the end point of the sliding operation in the showable area.

The reason why a shrunk image is shown by a downward sliding operation is because a lateral sliding operation is in many cases assigned to an operation of transitioning the screen. When a sliding operation in a certain direction is assigned to cause a certain operation, a sliding operation in a direction orthogonal to the certain direction may be assigned to the operation of showing a shrunk screen.

Although the embodiments have been described, it is clearly understood that the embodiments disclosed herein are by way of illustration and example only and are intended to include any modification within the meaning and scope equivalent to the terms of the claims.

The invention claimed is:

1. A mobile terminal comprising:
a display configured to show an image including a plurality of icons in a showable area;
a touch panel; and
at least one processor configured to, when a lateral sliding operation is executed starting from a position on the touch panel corresponding to a specific icon being shown, shrink and move the image being shown in a direction toward an end point of the lateral sliding operation in the showable area, wherein the plurality of icons shrink in scale with the image, and wherein the specific icon includes an icon, that when pressed and held, does not cause the mobile terminal to perform an operation, and wherein the at least one processor is configured to, based on a user setting, set a shrink ratio and a screen area when shrinking the image based on a position on the touch panel touched by a user.

2. The mobile terminal according to claim 1, wherein the specific icon is located at the lowest arrangement position among arrangement positions of the plurality of icons, and
the at least one processor is configured to, when a left sliding operation is executed starting from the position on the touch panel corresponding to the specific icon, shrink and move the image being shown to a lower left position in the showable area.

3. The mobile terminal according to claim 2, wherein the at least one processor is configured to, when a right sliding operation is executed starting from the position on the touch panel corresponding to the specific icon, shrink and move the image being shown to a lower right position in the showable area.

4. The mobile terminal according to claim 1, wherein the specific icon includes an icon representing a folder.

5. The mobile terminal according to claim 4, wherein the specific icon includes an icon representing a folder including an icon representing an application.

6. The mobile terminal according to claim 1, wherein the at least one processor is configured to, after shrinking and moving the image, shrink and show a subsequent image at an identical position to the position of the moved image.

7. A mobile terminal comprising:
a display configured to show an image including a plurality of icons in a showable area;
a touch panel; and
at least one processor configured to, when a lateral sliding operation is executed starting from a position on the touch panel corresponding to a navigation key, shrink and move the image being shown in a direction toward an end point of the lateral sliding operation in the showable area, wherein the plurality of icons shrink in scale with the image, and wherein the at least one processor is configured to, based on a user setting, set a shrink ratio and a screen area when shrinking the image based on a position on the touch panel touched by a user.

8. The mobile terminal according to claim 7, wherein the at least one processor is configured to, when a left sliding operation is executed starting from the position on the touch panel corresponding to the navigation key, shrink and move the image being shown to a lower left position in the showable area.

9. The mobile terminal according to claim 8, wherein the at least one processor is configured to, when a right sliding operation is executed starting from the position on the touch panel corresponding to the navigation key, shrink and move the image being shown to a lower right position in the showable area.

10. The mobile terminal according to claim 7, wherein the navigation key includes a home key.

11. The mobile terminal according to claim 7, wherein the at least one processor is configured to, after shrinking and moving the image, shrink and show a subsequent image at an identical position to the position of the moved image.

12. A mobile terminal comprising:
- a display configured to show an image including a plurality of icons in a showable area;
- a touch panel; and
- at least one processor configured to, when a downward sliding operation is executed starting from a position on the touch panel where the plurality of icons are not located, shrink and move the image being shown in a direction toward an end point of the downward sliding operation in the showable area, wherein the plurality of icons shrink in scale with the image, and wherein the at least one processor is configured to, based on a user setting, set a shrink ratio and a screen area when shrinking the image based on a position on the touch panel touched by a user.

13. The mobile terminal according to claim 12, wherein the at least one processor is configured to, when a downward sliding operation is executed starting from a certain position on a left edge of the touch panel, shrink and move the image being shown to a lower left position in the showable area.

14. The mobile terminal according to claim 13, wherein the at least one processor is configured to, when an upward sliding operation is executed starting from a certain position on the left edge of the touch panel after shrinking and showing the image at the lower left position, enlarge the shrunk image to an image size before the shrinking and move the enlarged image to the position before the shrinking.

15. The mobile terminal according to claim 12, wherein the at least one processor is configured to, when a downward sliding operation is executed starting from a certain position on a right edge of the touch panel, shrink and move the image being shown to a lower right position in the showable area.

16. The mobile terminal according to claim 15, wherein the at least one processor is configured to, when an upward sliding operation is executed starting from a certain position on the right edge of the touch panel after shrinking and showing the image at the lower right position, enlarge the shrunk image to an image size before the shrinking and move the enlarged image to the position before the shrinking.

17. The mobile terminal according to claim 12, wherein the at least one processor is configured to, after shrinking and moving the image, shrink and show a subsequent image at an identical position to the position of the moved image.

* * * * *